United States Patent
Kingston et al.

(10) Patent No.: US 11,904,258 B2
(45) Date of Patent: Feb. 20, 2024

(54) THERMAL ISOLATION CHAMBERS AND CHROMATOGRAPHY SYSTEMS INCLUDING THEM

(71) Applicant: PerkinElmer U.S. LLC, Shelton, CT (US)

(72) Inventors: Chad Kingston, Saratoga Springs, UT (US); Nathan L Porter, Kaysville, UT (US); Benjamin J. Black, West Valley City, UT (US)

(73) Assignee: PerkinElmer U.S. LLC, Shelton, CT (US)

( * ) Notice: Subject to any disclaimer, the term of this patent is extended or adjusted under 35 U.S.C. 154(b) by 283 days.

(21) Appl. No.: 17/034,851

(22) Filed: Sep. 28, 2020

(65) Prior Publication Data

US 2022/0096961 A1    Mar. 31, 2022

(51) Int. Cl.
*B01D 15/16* (2006.01)
*B01D 15/20* (2006.01)
*B01D 15/22* (2006.01)
*G01N 30/30* (2006.01)

(52) U.S. Cl.
CPC ........... *B01D 15/161* (2013.01); *B01D 15/22* (2013.01); *G01N 30/30* (2013.01); *B01D 15/20* (2013.01); *G01N 2030/3084* (2013.01)

(58) Field of Classification Search
CPC ...... B01D 15/161; B01D 15/22; B01D 15/20; G01N 30/30; G01N 2030/3084
See application file for complete search history.

(56) References Cited

U.S. PATENT DOCUMENTS

| | | | | |
|---|---|---|---|---|
| 4,181,613 | A * | 1/1980 | Welsh | G01N 30/30 96/104 |
| 5,744,029 | A * | 4/1998 | Li | G01N 30/30 210/175 |
| 5,807,426 | A * | 9/1998 | Ohtsuki | G01N 30/30 95/87 |
| 5,942,675 | A * | 8/1999 | Wilson | G01N 30/30 95/82 |
| 6,248,158 | B1 * | 6/2001 | Abdel-Rahman | G01N 30/30 95/87 |
| 2008/0047323 | A1 * | 2/2008 | Botelho | G01N 30/30 73/23.35 |
| 2017/0038346 | A1 * | 2/2017 | Shreve | B01D 15/16 |

OTHER PUBLICATIONS

Federal Remediation Technologies Roundtable, "6.2.9 GS/Ion Trap MS". https://web.archive.org/web/20180815195925/https://frtr.gov/site/6_2_9.html. Aug. 15, 2018.*
Written Opinion of the International Searching Authority for related application WO2022067206.*

* cited by examiner

Primary Examiner — Benjamin L Lebron
(74) Attorney, Agent, or Firm — Banner & Witcoff, Ltd.

(57) ABSTRACT

Thermal isolation chambers that can be used to heat or cool a chromatography column are described. Certain configurations include at least one plate and an insulative barrier. The plate and insulative barrier can form a cyclical air flow path such that air in the cyclical air flow path can be provided to a chromatography column to remove heat from the chromatography column. The heat can be transferred to the plate. Systems including the thermal isolation chambers, and methods of using the thermal isolation chambers to perform chromatographic separations are also described.

15 Claims, 20 Drawing Sheets

THERMAL ISOLATION CHAMBERS AND CHROMATOGRAPHY SYSTEMS INCLUDING THEM

TECHNOLOGICAL FIELD

Certain configurations described herein are related to thermal isolation chambers. More particularly, certain configurations are directed to a chamber that can thermally isolate a chromatography column in an analytical instrument.

BACKGROUND

Chromatography systems use a column to separate analytes from each other. Depending on the configuration of the chromatography system, the chromatography column is often heated during a chromatographic separation.

SUMMARY

In an aspect, a thermal isolation chamber comprises a first plate, a second plate, and an insulative barrier. In certain embodiments, the thermal isolation chamber is configured to receive a chromatography column and thermally isolate the received chromatography column from other components in the thermal isolation chamber. In other embodiments, the thermal isolation chamber comprises a first cyclical air flow path between the insulative barrier and the first plate and between the insulative barrier and the second plate, wherein the first cyclical air flow path is configured to receive an air flow and provide the received air flow to the received chromatography column to remove heat from the received chromatography column and transfer the removed heat to one or both of the first plate and the second plate.

In certain configurations, the thermal isolation chamber comprises a cooling device configured as a fan to provide the air flow through the first cyclical air flow path. In other configurations, a cooling element is present in the thermal isolation chamber, wherein the fan is thermally coupled to the cooling element to provide cooled air to the first cyclical air flow path. In certain embodiments, the cooling element is downstream of the fan. In other embodiments, the cooling element is upstream of the fan. In certain embodiments, at least one of the first plate and the second plate comprises a heat sink. In some embodiments, at least one of the first plate and the second plate is configured to be cooled to decrease a temperature of air flow through the first cyclical air flow path. In other embodiments, each of the first plate and the second plate is configured to be cooled to decrease a temperature of air flow through the first cyclical air flow path. In some embodiments, at least one of the first plate and the second plate is thermally coupled to an external heat sink outside the chamber. In other embodiments, at least one heat pipe thermally coupled to one of the first plate and the second plate is present. In certain embodiments, the first plate is removable and the second plate is part of a housing of a chromatography system. In other embodiments, the first plate comprises a metal material. In certain configurations, a thermal conductivity of the metal material is at least 150 Watts/meter-Kelvin. In other configurations, the thermal isolation chamber is present in a chromatograph that is sealed from ambient environment to prevent ambient air from entering into the chromatograph. In some configurations, at least one of the first plate and the second plate comprises an internal channel or pores.

In another aspect, a method of controlling a temperature of a thermally isolated chromatography column in a thermal isolation chamber in a chromatograph is described. In certain configurations, the method comprises circulating air through a first cyclical air flow path within the thermal isolation chamber comprising the thermally isolated chromatography column to cool the thermally isolated chromatography column from a first temperature to a second temperature lower than the first temperature.

In certain embodiments, the method comprises discontinuing circulation of the air or slowing circulation of the air through the first cyclical air flow path during a chromatographic separation. In other embodiments, the method comprises continuing flow of the air circulated through the first cyclical air flow path after the chromatographic separation to cool the thermally isolated chromatography column from the first temperature to the second temperature lower than the first temperature. In some embodiments, the method comprises decreasing a temperature of the air circulated through the first cyclical air flow to remove heat from the thermally isolated chromatography column and return the thermally isolated chromatography column to the second temperature prior to initiation of another chromatographic separation. In certain configurations, the method comprises introducing external cooling air into the first cyclical air flow path to decrease a temperature of the chromatography column to the second temperature. In other configurations, the method comprises cooling a first plate of the thermal isolation chamber to cool the chromatography column to the second temperature. In some embodiments, the method comprises providing the air through the first cyclical air flow path using a fan inside the thermal isolation chamber. In certain embodiments, the method comprises cooling the air circulated through the first cyclical air flow path using a cooling element inside the thermal isolation chamber. In other embodiments, the method comprises heating the chromatography column from the second temperature to the first temperature using a heating element thermally coupled to the chromatography column, and cooling the chromatography column from the first temperature to the second temperature by decreasing a temperature provided by the heating element and circulating the air through the cyclical air flow path using a fan within the thermal isolation chamber. In certain examples, the method comprises heating the air circulated through the first cyclical air flow path to increase a temperature of the chromatography column to the first temperature.

In an additional aspect, an analytical instrument comprises a housing, a thermal isolation chamber and a chromatography column space. The analytical instrument may also comprise an injector and other components if desired. In some configurations, the thermal isolation chamber comprises a first plate. In certain embodiments, the thermal isolation chamber is configured to thermally isolate the chromatography column from other components in the housing. In certain embodiments, the thermal isolation chamber comprises a first cyclical air flow path formed from the first plate and an insulative barrier in the thermal isolation chamber, wherein the first cyclical air flow path is configured to provide an air flow in the first cyclical air flow path to the chromatography column to remove heat from the received chromatography column, and wherein the thermal isolation chamber is configured to transfer the removed heat to the first plate.

In certain embodiments, the analytical instrument comprises an ionization source configured to fluidically couple to the chromatography column to receive separated analyte from the chromatography column and ionize the received, separate analyte. In some embodiments, the analytical instrument comprises a mass analyzer configured to receive the ionized analyte. For example, the mass analyzer may comprise an ion trap or other mass analyzer. In certain configurations, the analytical instrument further comprises a detector.

In some embodiments, a heating element configured to thermally couple to the chromatography column and heat the chromatography column from a first temperature to a second temperature is present. In certain embodiments, the heating element is configured to physically contact the chromatography column. In other embodiments, the chromatography column is wound around the heating element.

In certain configurations, the analytical instrument comprises a processor configured to turn on a fan after a chromatographic separation to cool the chromatography column by circulating air through a first cyclical air flow path within the thermal isolation chamber comprising the thermally isolated chromatography column to cool the thermally isolated chromatography column from a first temperature to a second temperature lower than the first temperature. In some embodiments, the processor is configured to turn the fan off, or slow the fan down, after the chromatography column reaches the second temperature.

In certain embodiments, the thermal isolation chamber further comprises a second plate that can receive heat from air in the first cyclical air flow path to remove heat and cool the chromatography column. In some configurations, the housing of the instrument is configured as the second plate of the thermal isolation chamber.

Additional aspects, embodiments, features, configurations and components are described in more detail below.

BRIEF DESCRIPTION OF THE SEVERAL VIEWS OF THE DRAWINGS

Certain aspects, embodiments, configurations and features are described with reference to the accompanying drawings in which.

Figure 1A:
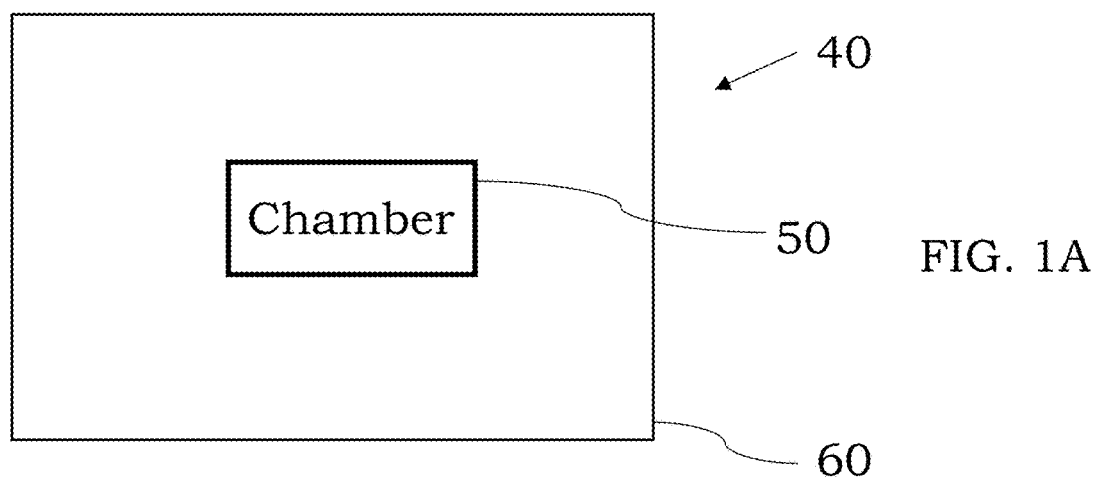
FIG. 1A is a block diagram showing a generalized illustration of a chamber positioned within a housing of a chromatography apparatus, in accordance with some embodiments.

It will be recognized by the person having ordinary skill in the art, given the benefit of this disclosure that while certain configurations, embodiments and features are described in connection with chambers, the described configurations, embodiments and features are intended to be merely illustrative of some of the many different configurations, embodiments and features that may be included in the chambers. Additional configurations, embodiments and features will be recognized by the person having ordinary skill in the art, given the benefit of this description. The size of one component relative to another component may be exaggerated, distorted or otherwise not drawn to scale in the figures to facilitate a more user friendly description of the technology described herein. No particular dimensions, sizes, shapes, geometries or other arrangements are intended to be required unless made clear from the description of that particular embodiment. Certain depictions of the thermal chambers are shown in two dimensions to facilitate a better understanding of that particular embodiment. It will be recognized by the person having ordinary skill in the art, given the benefit of this disclosure, that the thermal chambers are three dimensional and can include front, back, top and bottom surfaces in addition to any side surfaces of plates shown.

DETAILED DESCRIPTION

Various illustrations are described below of a chamber that can thermally isolate a chromatography column from one or more other components in a system. For example, in some chromatographic apparatus, the heater used to heat the column can result in heating of the entire chromatography apparatus. Moreover, the more quickly a column can cool down after being heated, the more quickly and efficiently tests may be run on the chromatographic apparatus. Heating of the chromatographic apparatus can be undesirable because certain components of the chromatographic apparatus (e.g., processors, printed circuit boards, chips, etc.) may be heat sensitive. Heating of the non-column components of the chromatographic apparatus, for example, can be especially undesirable in compact and/or portable chromatographic apparatuses where the components of the chromatographic apparatus are sealed in a housing that prevents or reduces the exchange of air with the external environment. For example, a sealed housing may be used to prevent dust and dirt particles from the outside from getting to the inside of the chromatographic apparatus. A sealed housing can also prevent damaging the apparatus during a decontamination procedure, such as (as an example) when military personnel or first responders use bleach or other cleaners to clean and remove chemicals that may contaminate the outside of the apparatus while in a "hot zone." Moreover, quickly cooling the column in such compact and/or portable chromatographic apparatuses can be difficult when the column can exchange heat with the other components of the apparatus and/or when the ambient temperate (e.g., the temperature of the environment where the apparatus is located) is relatively hot (e.g., greater than 40 degrees Celsius).

In certain existing chromatographic apparatus, the column heater and other components may be confined within the housing with no separation between the various components. Separating the column heater from the other components of the chromatographic apparatus can reduce the amount the other components are heated during operation and enhance the performance of the chromatographic apparatus. For example and referring to FIG. 1A, a block diagram is shown of a chamber 50 that may house a chromatography column (not shown). The chamber 50 is generally positioned within a larger housing or structure 60 that can include other components of the chromatography apparatus 40, e.g., fluid lines, traps, injectors, heaters, detectors, etc. A chromatography column can be contained within the chamber 50 within the housing 60 of the chromatographic apparatus 40 to thermally isolate the column from the other components within the housing 60. As noted in more detail below, one or more heaters or cooling devices (or both) may be present in the chamber 50, or otherwise thermally coupled to the chamber 50, so the column within the chamber 50 can be heated and/or cooled. Reducing heat exchange between the chamber 50 and the other components of the chromatographic apparatus may further increase performance. While the exact configuration of the chamber 50 can vary, as discussed in more detail below, the chamber 50 may include a plurality of sides (e.g., faces of the three-dimensional chamber), and, if desired, one or more of the sides adjacent to the housing 60 containing other components may be thermally insulative (or otherwise resistant to heat transfer) to reduce the amount of heat that is transferred from the chamber 50 to the other components in the housing 60 (or vice versa). In certain configurations, the chamber 50 may be sealed such that dust, air, particles, etc. cannot enter into the chamber 50 from the space surrounding the chamber 50 and/or from air or other space outside of the housing 60. In some configurations, the presence of a thermal path for the heat from the chamber 50, which can include a column heater, to escape the chromatographic apparatus 40 may further enhance performance. For example, one or more of the sides of the chamber may be adjacent to the outside environment and include a thermally conductive material to facilitate heat transfer from within the chamber 50 to the outside environment rather than into the housing 60 where the other components of the chromatographic apparatus 40 are located. In some embodiments, a cooling device (e.g., a heat sink or water chiller) may be coupled to the thermally conductive side (or sides) of the chamber 50 to further accelerate the cooling of the chamber 50 and/or the column or other components within the chamber 50.

In the various examples described below, certain illustrative configurations of chambers that can thermally isolate a chromatography column from at least one other component of an instrument, e.g., a chromatography apparatus, are described to facilitate a better understanding of the technology. The illustrative configurations, embodiments, features and other components described below are merely some of those configurations, embodiments, features and components that can be present in, or used with, the chambers described herein. The thermal isolation chambers can be used in gas chromatography (GC), liquid chromatography (LC) or other chromatographic techniques where it may be desirable to heat and cool a separation column or separation device. Additional components not shown in the figures may also be used with the chambers and other components described herein. For example, a thermocouple or temperature sensor can be present to monitor the temperature of a chromatography column. The illustrations described below may refer to the presence of one or more plates, surfaces or other features to provide a more user friendly description. It will be recognized by the skilled person, given the benefit of this disclosure, that the chambers described herein generally are three-dimensional and can include front and back and top and bottom surfaces or sides in addition to the described plates. These other surfaces or sides may also facilitate heat transfer out of the chamber or may be purely structural and generally not facilitate heat transfer out of the chamber to any substantial degree. For example, depending on the overall air flow within the chamber, the front and back surfaces may be structural to provide an enclosed chamber without being thermally conductive to facilitate heat removal from the chamber. In the description below, the front and back surfaces are omitted to show better certain other components and configurations of the chamber.

In certain embodiments, a chromatography column includes a stationary phase which is typically a coating present on inner surfaces of the chromatography column. A mobile phase, e.g., a gas or liquid, carries analyte into the chromatography column where differential adsorption and desorption of analytes from the stationary phase can act to separate the analytes. Individual analytes can elute from the column and can be provided to a detector or other component that is fluidically coupled to an outlet of the chromatography column. The chromatography column can take many different shapes and configurations and is often coiled to increase its overall length while reducing the amount of space the chromatography column occupies. The chromatography column is often heated during the chromatography separation to facilitate separation of the analytes. In general, higher chromatography column temperatures speed up the diffusion rate of analytes increasing the movement from the stationary phase to the mobile phase resulting in improved separations. The analytes travel through the column, at least in part, based on the flow rate of the carrier gas. Chromatography column temperature fluctuations can lead to a reduction in retention time precision and accuracy. For example, heat emitted from other components within the chromatography instrument or chromatograph can undesirably affect the chromatography column temperature. Further, when a chromatography column is cooled after heating, the residual heat can be transferred to internal components in the instrument and increase the difficulty of properly controlling the column temperature in successive chromatography separations and/or heating up those components within the instrument.

In certain configurations, a chamber that can thermally isolate a chromatography column is described. Depending on the overall construction of the chamber, the chamber may comprise one or more sides, surfaces, plates or other structures that can thermally isolate the chromatography column from other components in the chromatography system. For example, the chamber may comprise a first plate and a second plate that can form a chamber. An insulative material may be present, for example, on the outside of the first and second plates to reduce or prevent heat transfer out of the thermal isolation chamber to other components of the chromatography system. Alternatively or in addition, an insulative barrier may be present around the chromatography column in the chamber to assist in heat retention by the column. The first and second plates may also be thermally conductive to facilitate removal of heat from the chamber once a final temperature is reached, e.g., to facilitate return of the column in the chamber to at or below a starting temperature. If desired, one or more of the plates may be part of a housing or chassis of the instrument. In some instances, the chamber can be sized and arranged to receive a chromatography column. In certain embodiments, the chamber comprises one or more cyclical air flow paths between the received chromatography column and the one or more plates. In certain configurations, the cyclical air flow path can include an insulative barrier or insulative insert present within a chamber or cavity where the chromatography column is present. The one or more plates can be thermally coupled to the received chromatography column to add heat, remove heat or both. For example, air can flow around the insulative barrier, and heat in the air flow can be transferred to the plates to facilitate removal of heat from the chromatography column. In the case of heat removal, the one or more plates can be designed to receive heat from the chromatography column to cool the chromatography column down between chromatography separations. While the chamber can thermally isolate the chromatography column from other components of the chromatograph, the chamber need not be a "closed system" or "isolated system" in the thermodynamic sense. For example, heat, work and matter can be exchanged with the surroundings, but the amount of heat, work or matter exchanged between the chamber and the surrounding components is relatively small compared to the amount of heat exchanged between the column and the one or more plates such that heat from surrounding components does not substantially contribute to the temperature of the chromatography column. Various illustrations of chambers that can be used to thermally isolate a chromatography column are described below.

Figure 1B:
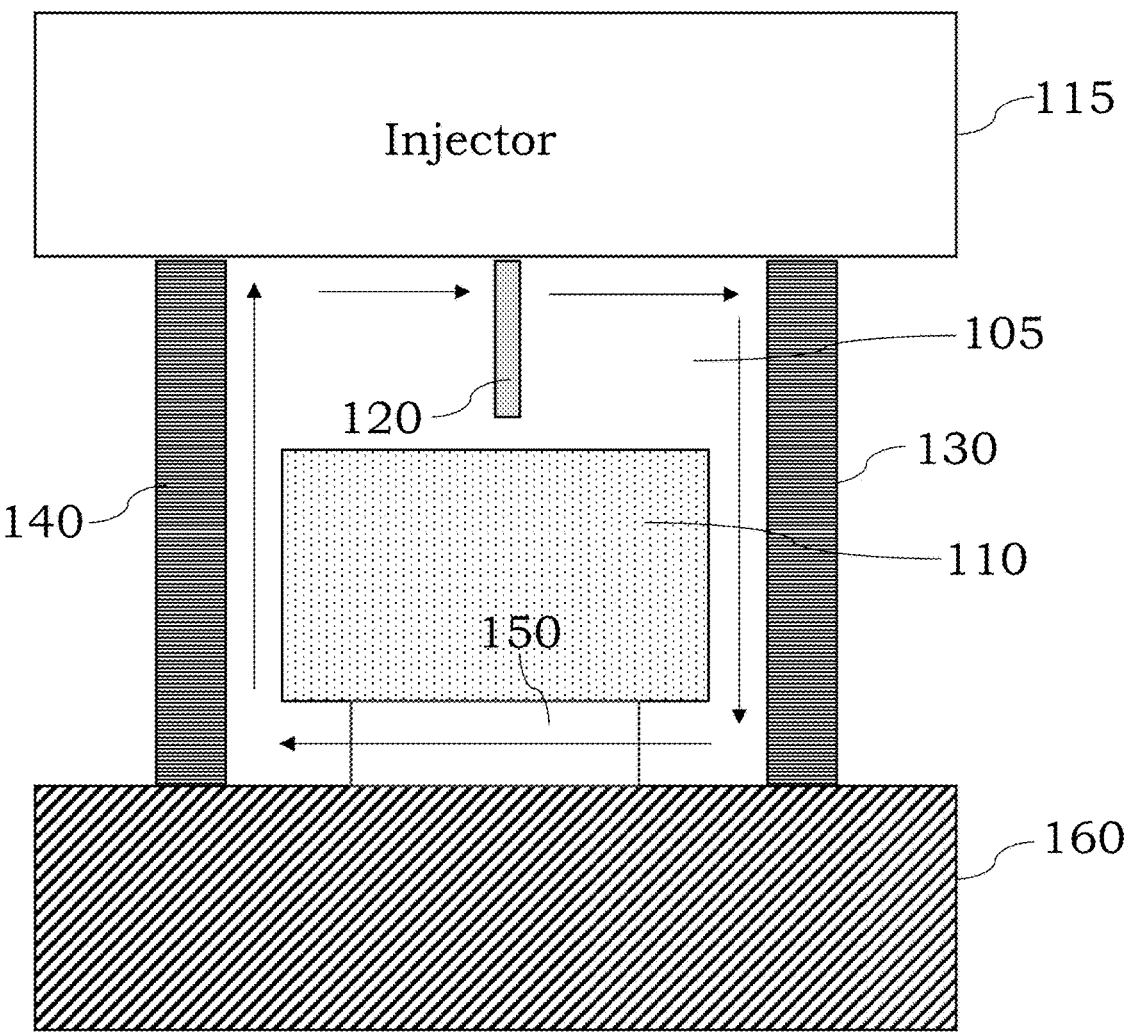
FIG. 1B is an illustration of a chamber comprising a first plate and a second plate in an insulative barrier, in accordance with some examples.

In certain embodiments and referring to FIG. 1B, a simplified illustration of a chamber 105 is shown that comprises an insulative barrier 110, a first plate 130 and a second plate 140. An injector 115 is shown and is typically fluidically coupled to a column 120 to provide sample from the injector 115 to the column 120. In some instances, at least one other side of the chamber, e.g., side 160, can be formed by the chromatograph housing or chassis or by other plates or structures that generally deter or reduce heat entry from other components of the chromatograph into the chamber 105 and/or reduce heat transfer away from the chamber 105 to other components of the chromatograph. A device 150, e.g., a fan, air pump, etc. can act to circulate air within the chamber 105. For example, air can generally flow around outer surfaces of the insulative barrier 110 and flow across surfaces of a column 120 to remove heat from the column 120. This heat can be transferred to the plate 130 as air is forced to flow around the barrier 110. Additional air can be provided from the device 150 to the plate 140 around the periphery of the barrier 110. Plate 140 can cool the air, at least to some degree, and provide cooled air back to the column 120 for further cooling of the column 120. In some embodiments, each of the plates 130, 140 may be passive in that they are not actively cooled or heated using a heating or cooling element. For example, the plates 130, 140 may have a large enough heat capacity to absorb heat from the column 120 as the air flows around the barrier 110 without the need to cool the plates 130, 140. In other instances, one or more of the plates 130, 140 may be actively cooled or heated to assist in controlling the temperature of the air (and resulting temperature of the column 120) inside the chamber 105. The insulative barrier 110 typically separates the column 120 from the device 150 so air from the device 150 does not directly contact the column 120 but can flow around the periphery of the barrier 110 and be incident on the column 120. By placing an insulative barrier 110 between the column 120 and the device 150, the device 150 can also be protected, to at least some degree, from the high temperatures often used during heating of the column 120. The barrier 110 may be in direct contact with the device 150 or can be spaced some distance from the device 150.

Figure 1C:
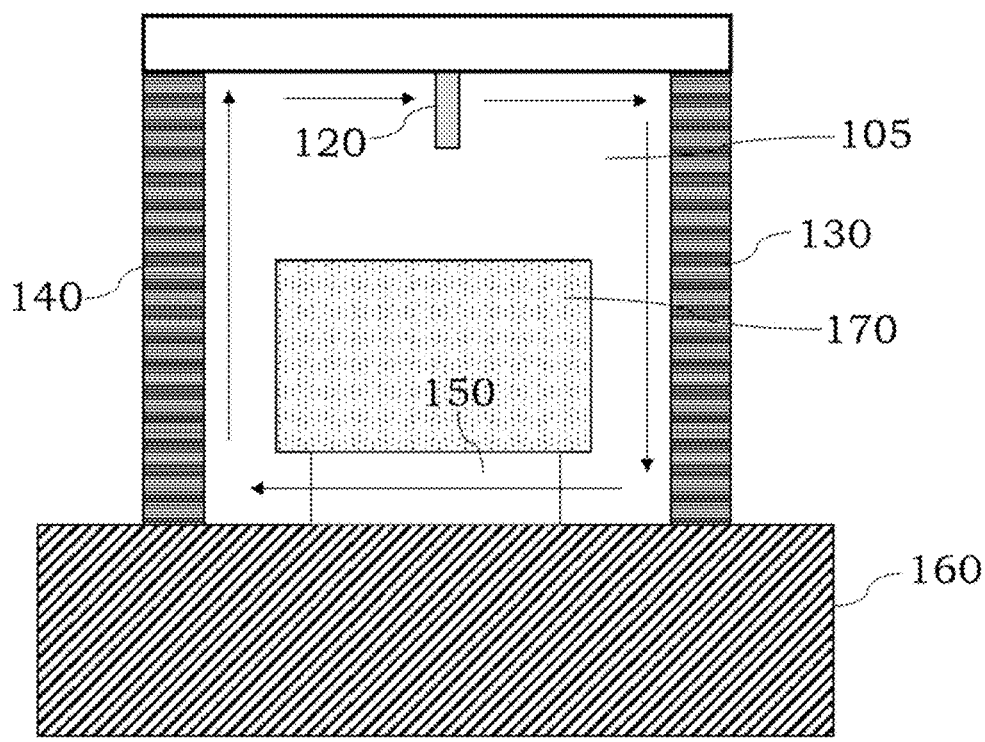
FIGS. 1C and 1D are illustrations showing an insulative barrier whose volume can be altered, in accordance with some configurations.
Figure 1D:
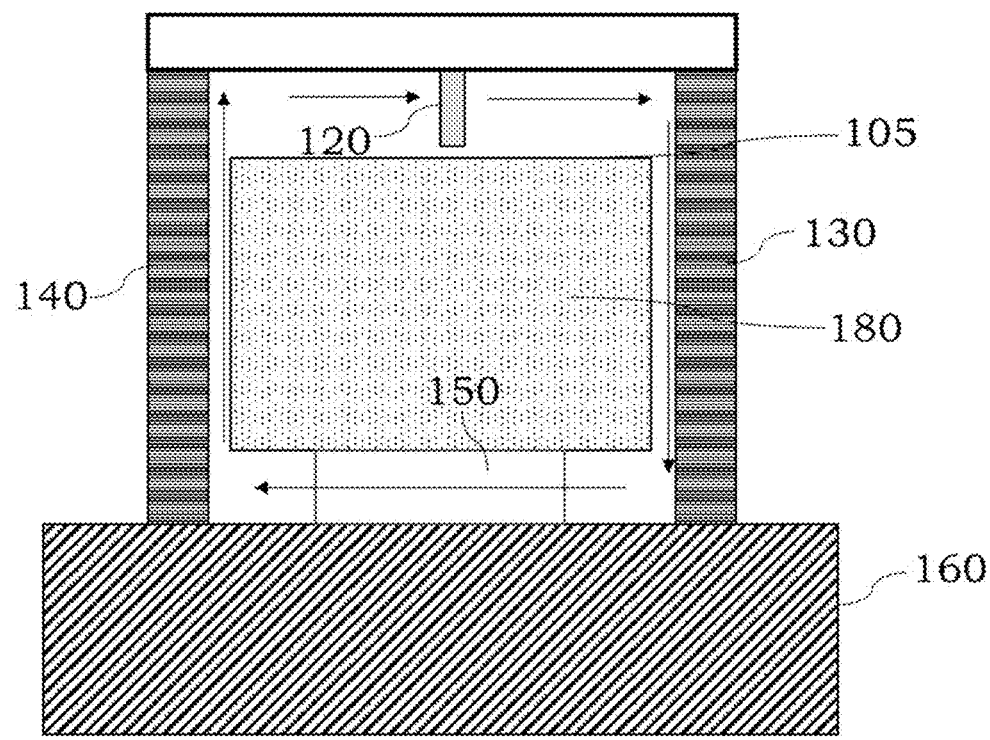

In some examples, the overall dimensions of the flow path produced by the presence of the insulative barrier may be fixed in the case of a fixed insulative barrier material. For example, the barrier 110 may comprise an insert comprising an insulative material whose dimensions do not generally change during heating and cooling of the column 120. In other instances, the insulative barrier 110 may be expandable or configurable so the overall dimensions of the barrier 110 can be altered during use. FIG. 1C shows illustrations where a barrier 170 comprises a first volume at a first temperature. In FIG. 1D, the volume has increased to provide a barrier 180 at a second temperature. For example, where the device 150 is a fan, it may be desirable to increase the overall volume of the barrier at a higher temperature to increase the velocity of the air flow at a constant fan speed by decreasing the space between the surfaces of the barrier 170 and the walls of the chamber. The volume of the barrier can be increased by inflating the barrier with air in instances where the barrier is configured as an inflatable bladder. Expanding the volume of the barrier can also further thermally isolate the device 150 from the other components on the chamber to protect the device 150. In some examples, the barriers within the chamber may comprise a material whose volume can increase with increasing temperature and decrease with decreasing temperature. If desired, a first insulative barrier can be manually removed from a chamber and replaced with a second, larger insulative barrier to alter the overall air flow through the chamber.

In certain embodiments, the insulative barrier or insert may be produced from materials with high heat capacities so they generally do not heat up quickly. Illustrative materials that can be used in the insulative barriers described herein include, but are not limited to, ceramic wool, glass wool, stone wool, foams such as polyimide foams or other materials If desired, the insulative barrier can also be actively or passively cooled to further assist in removal of heat from a column during operation of a chromatography system.

Figure 2:
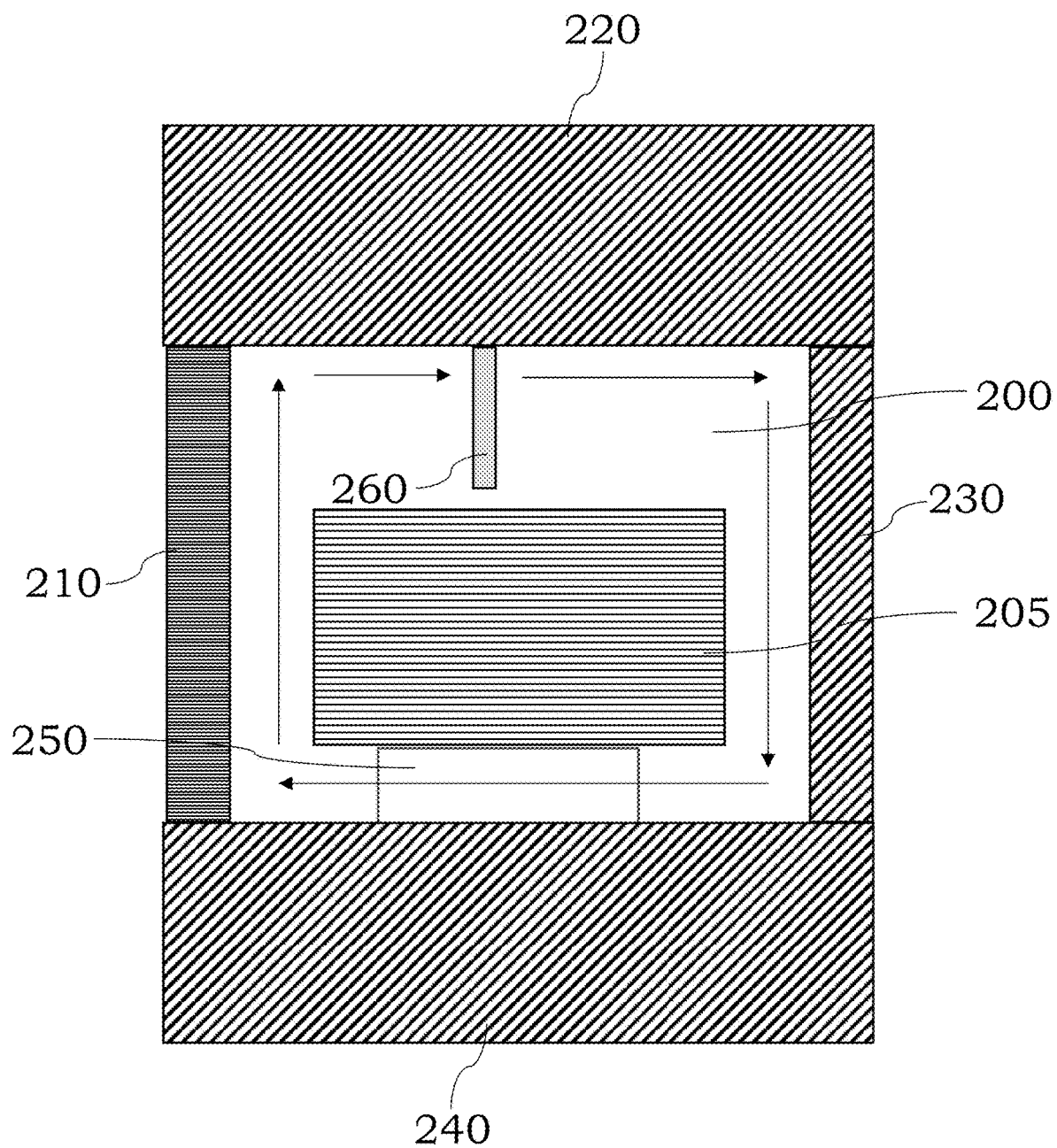
FIG. 2 is an illustration of a chamber comprising a single plate, in accordance with certain embodiments.

In certain embodiments, three of the sides of the chamber may be formed from an instrument chassis or housing. For example, a top surface, side surface and bottom surface of the chromatograph housing along with a single plate can form a chamber that can be used to thermally isolate the chromatography column from other components in the chromatograph. One illustration is shown in FIG. 2, where a chamber 200 is formed from a plate 210 and sides 220, 230, 240 of the chromatograph housing. A device 250, e.g., a fan, air pump, etc. can act to circulate air within the chamber 200. An insulative barrier or insert 205 separates a column 260 from the device 250 and creates an air flow path such that air flows around the periphery of the barrier 205. For example, air can be provided by the device 250, flow to the plate 210, be incident on surfaces of a column 260 and then incident on surfaces of the side 230 to remove heat from the column 260. While not shown, the plate 210 or the side 230 or both can optionally include a heat sink, heating element, cooling element or other features. Additional air can be provided from the device 250 to the plate 210. The plate 210 can cool the air, at least to some degree, and provide cooled air back to the column 260 for further cooling of the column 260. In some embodiments, the plate 210 may be passive in that it is not actively cooled or heated using a heating or cooling element. For example, the plate 210 may have a large enough heat capacity to absorb heat from the column 260 without the need to cool the plate 210. In other instances, one or both of the plate 210 and the side 230 may be actively cooled or heated to assist in controlling the temperature of the air (and resulting temperature of the column 260) inside the chamber 200.

Figure 3A:
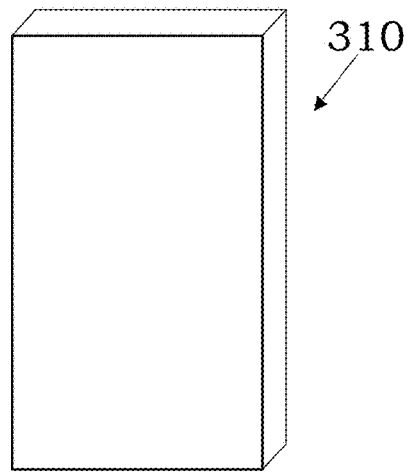
FIGS. 3A and 3B are illustrations showing certain shapes that a plate may adopt, in accordance with certain embodiments.

In certain embodiments, the plate may adopt many different shapes and sizes. For example, a rectangular plate 310 is shown in FIG. 3A. The rectangular plate 310 can be produced from a single material or a combination of materials. For example, the rectangular plate 310 can include a metal coating on a surface facing inward toward the chamber and a different material on other surfaces. If desired, two or more rectangular plates can be sandwiched together and used as a multi-layer plate that is present on one side of the chamber. Alternatively, a rectangular plate can be used with a plate other than a rectangular plate. As noted below, the rectangular plate desirably comprises at least one material that is thermally conductive so heat can be transferred to/from a column space formed by the chamber where the column resides. In some examples, the rectangular plate has a length from about 5 cm to about 20 cm, a width of about 3 cm to about 15 cm and a thickness of about 0.5 mm to about 5 mm, though other dimensions may be used depending on the overall configuration of the chamber and whether active cooling is used with the chamber. The thickness of the plate 310 need not be the same along its length or width. For example, an increased thickness can be present at certain areas if desired. In some embodiments, the rectangular plate 310 can couple to one end or side of the chamber and can be removed to permit insertion and removal of different chromatography columns into the chamber. Where a rectangular plate 310 is present, an overall volume of the chamber can vary from about 1000 cm$^3$ to about 10,000 cm$^3$.

Figure 3B:
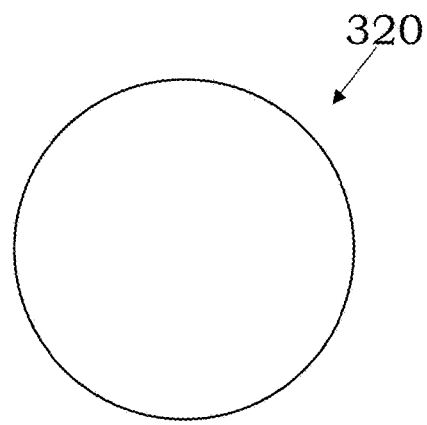

In some configurations, the plate may be a circular plate 320 as shown in FIG. 3B. The circular plate 320 can be used on an end of a cylindrical or circular chamber configured to receive a chromatography column. For example, a cylindrical chamber may provide for improved air circulation than a chamber where hard bends or angles are present. The circular plate 320 can be produced from a single material or a combination of materials. For example, the circular plate 320 can include a metal coating on a surface facing inward toward the chamber and a different material on other surfaces. If desired, two or more circular plates can be sandwiched together and used as a multi-layer circular plate that is present on one side of the chamber. Alternatively, a circular plate can be used with a plate other than a circular plate. As noted below, the circular plate 320 desirably comprises at least one material that is thermally conductive so heat can be transferred to/from a column space formed by the chamber where the chromatography column resides. In some examples, the circular plate 320 has a diameter from about 10 cm to about 50 cm and a thickness of about 1 mm to about 3 mm. The thickness of the plate 320 need not be the same along its entire surface. For example, an increased thickness can be present at certain areas if desired. In some embodiments, the circular plate 320 can couple to one end or side of the chamber and can be removed to permit insertion and removal of different chromatography columns into the chamber. Where a circular plate 320 is present, an overall volume of the chamber can vary from about 1000 cm$^3$ to about 10,000 cm$^3$.

While rectangular and circular plates are specifically described and shown, plate shapes other than rectangular and circular shapes could be used instead. For example, triangular, elliptical, trapezoidal, square or other plate shapes could be used instead. Where two or more plates are used to form a chamber that can thermally isolate column, the plates need not have the same shape, thickness or other dimensions. In addition, the structures need not even be plates but may instead be formed channels, surfaces, pipes or ducts of any shape that can facilitate heat transfer from the chamber.

Figure 4:
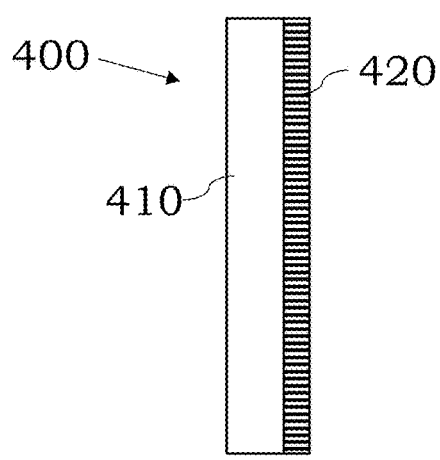
FIG. 4 is an illustration showing a multi-layer plate, in accordance with some embodiments.

In certain embodiments, the exact materials used in the plate or plates (or the surfaces of the chamber that can facilitate heat removal from the chamber) may vary. In some configurations, at least some of the material present in one of the plates can have a thermal conductivity of at least 150 Watts/meter-Kelvin, 200 Watts/meter-Kelvin or more. The entire plate can be produced from a single material or combinations of materials. Further, different areas of the plates may comprise different materials if desired. The materials can be present in a substantially uniform plate or may be present in layers or a coating on the plate. For example and referring to FIG. 4, a plate 400 is shown that comprises a first layer 410 and a second layer 420. If desired, some portion of the first layer 410 can be produced from a thermally conductive material or an insulating material or combinations thereof. The second layer 420 can be produced from one or more thermally conductive materials and typically faces inward toward the chamber. The second layer 420 may be uniform in thickness along the length of the layer 410 or have a variable thickness. In some instances, some portion of the layer 410 can function as an insulating layer to prevent heat transfer into and out of the chamber except at certain areas or regions of the layer 410, and the layer 420 is a thermally conductive layer to transfer heat from within the interior of the chamber. Illustrative thermally conductive materials include, but are not limited to, diamond, copper, silver, gold, aluminum, thermally conductive plastics with metal particles or metal nanoparticles and combinations thereof. Illustrative insulating materials include, but are not limited to, a glass, a foam, a wool, a fabric, a felt, an aerogel or other materials. In some instances, some portion of the layer 410 may be hollow and filled with a liquid or gas such as, for example, air, helium, hydrogen, nitrogen, oxygen, water, a liquid coolant such as, for example, ethylene glycol or other gases or liquids to increase the insulating capacity at those areas of the layer 410.

Figure 5A:
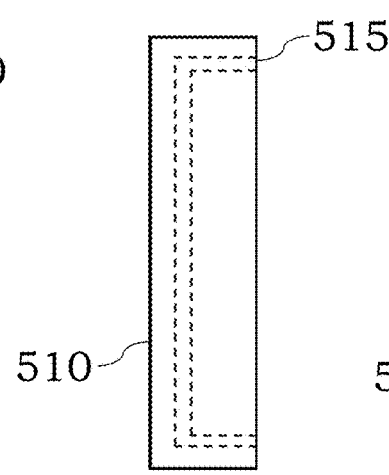
FIG. 5A is an illustration showing a plate with an internal channel.
Figure 5B:
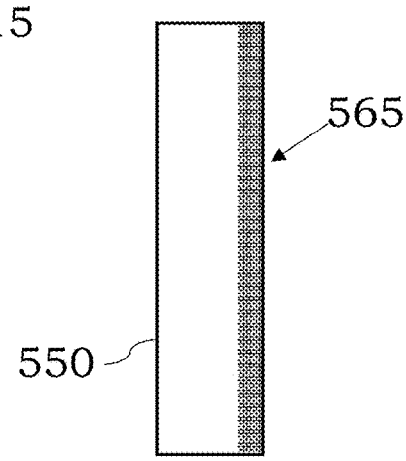
FIG. 5B is an illustration showing a plate with pores, in accordance with some examples.

In certain configurations, the plate need not be solid but can includes pores, channels or other features to facilitate heat transfer from a column or to a column. Referring to FIG. 5A, a plate 510 is shown comprising an internal channel 515 that can receive heated air and transfer the heat to the plate 510. The presence of the internal channel 515 can increase the overall surface area that can receive heat from the column when the column is being cooled. More than a single internal channel can be present if desired. In other configurations, a plate may comprise pores or apertures to facilitate transfer of heat. A side view of a plate 550 comprising pores 565 is shown in FIG. 5B. The pores 565 can provide increased surface area and permit air circulation through the pores 565 of the plate 550 to facilitate heat transfer to the plate 550 from the column when the column is cooled. The pores 565 can be present in a separate layer of the plate 550 or may be integral to the plate 550. For example, a thermally conductive mesh can be present as a layer on the plate 550.

Figure 6A:
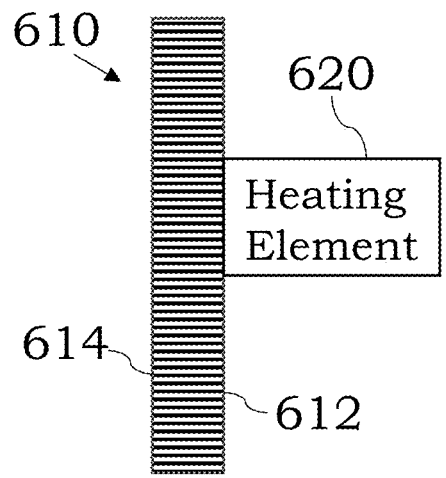
FIGS. 6A and 6B are illustrations showing a heating element thermally coupled to a plate, in accordance with certain embodiments.
Figure 6B:
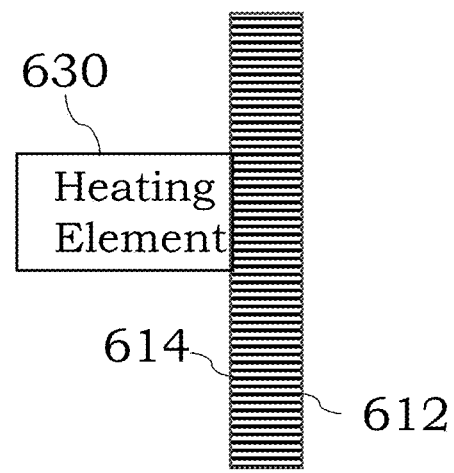

In certain embodiments, the plates used herein may comprise an optional heater, heating element or heating device. For example, a heater or heating element can be present to heat the plates to a desired temperature to increase the overall temperature within the chamber. Referring to FIG. 6A, a plate 610 comprises a heating element 620 present on a surface 612 of the plate 610. The surface 612 can form one side or wall of the chamber that comprises the chromatography column. In this configuration, circulating air within the chamber can be heated by the heating element 620 and then provided to the chromatography column to heat it. In another configuration as shown in FIG. 6B, a heating element 630 can be present on an opposite surface 614 of the plate 610. In this second configuration, the heating element 630 can heat up the plate 610. Circulating air can contact the heated plate 610 along the surface 612, and the heat can transfer from the heated air to the chromatography column in the chamber. Illustrative heaters, heating elements or heating devices include, but are not limited to, heated filaments, thermoelectric heaters, and other heating devices and elements. Where the heating element is within the chamber, the heating element could instead be present in a corner or on one of more of the plates or surfaces that form the chamber if desired. Further, more than a single heating element may also be present.

Figure 7A:
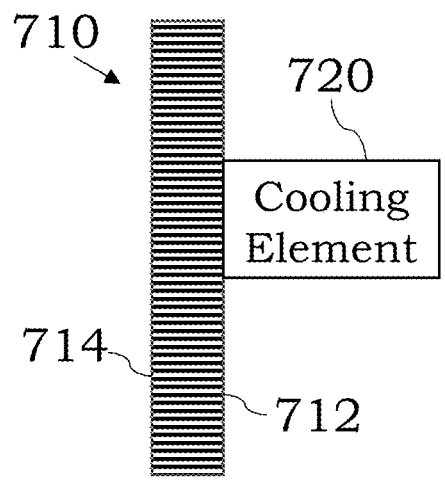
FIGS. 7A and 7B are illustrations showing a cooling element thermally coupled to a plate, in accordance with certain embodiments.
Figure 7B:
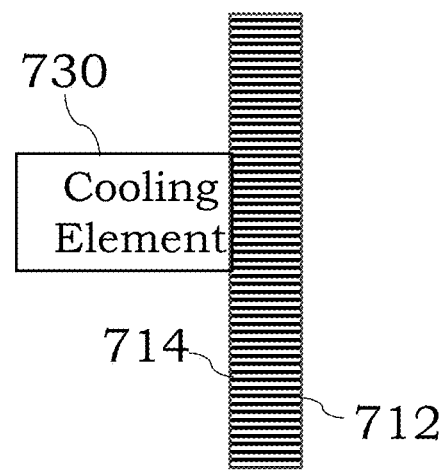

In other embodiments, the plates used herein may comprise a cooler or cooling device. For example, a cooler or heating device can be present to heat the plates to a desired temperature to increase the overall temperature within the chamber. Referring to FIG. 7A, a plate 710 comprises a cooling element 720 present on a surface 712 of the plate 710. The surface 712 can form one side or wall of the chamber that houses the chromatography column. In this configuration, circulating air within the chamber can be cooled by the cooling element 720 and then provided to the chromatography column to cool it. In another configuration as shown in FIG. 7B, a cooling element 730 can be present on an opposite surface 714 of the plate 710. In this second configuration, the cooling element 730 can cool the plate 710. Circulating air can contact the cooled plate 710 along the surface 712, and the cooled surface 712 can receive heat from the circulating air to cool down the chromatography column. Illustrative cooling devices include, but are not limited to, thermoelectric coolers such as Peltier coolers, magnetic cooling devices, refrigerated coils, and similar devices. Where the cooling element is within the chamber, the cooling element could instead be present in a corner or on one of more of the plates or surfaces that form the chamber if desired.

Figure 8A:
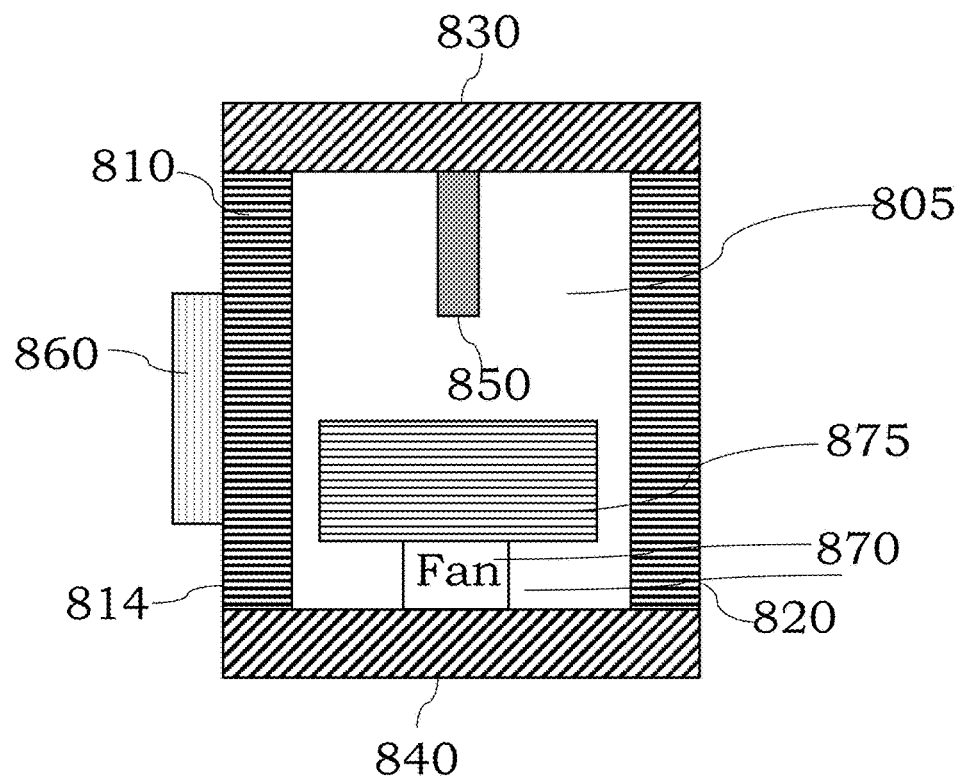
FIGS. 8A, 8B, 8C, 8D, 8E, and 8F are illustrations showing one or more heat sinks thermally coupled to a plate or surface, in accordance with certain embodiments.
Figure 8B:
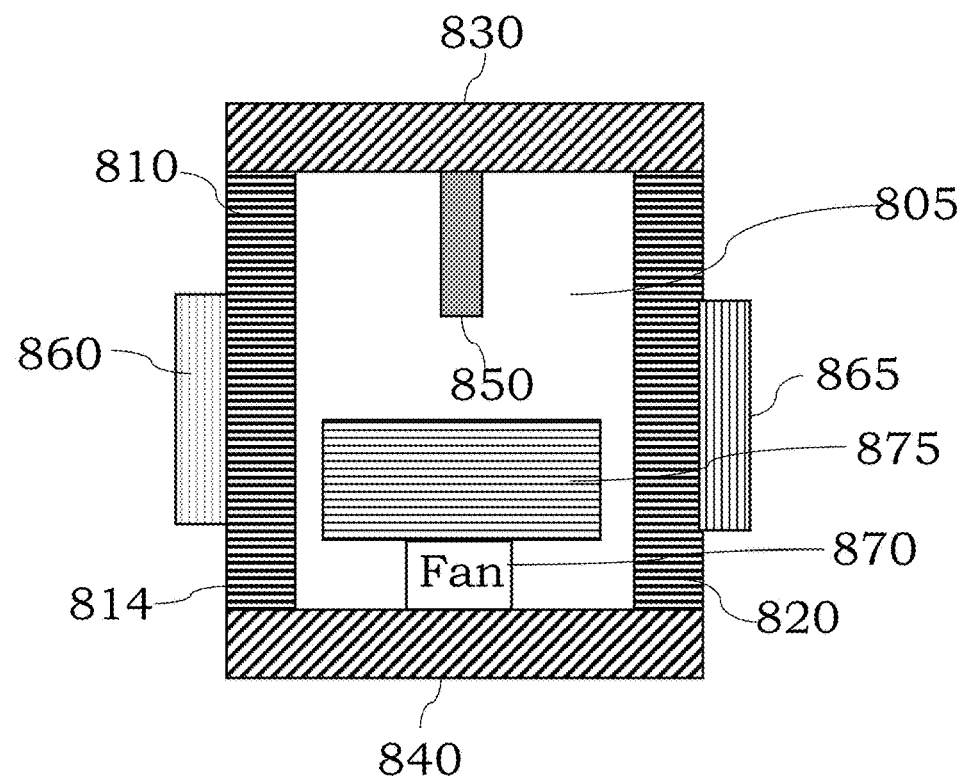

In some embodiments, the plates described herein may be thermally coupled to a heat sink to remove heat from the plates. The heat sink may physically contact the plate or may be thermally coupled to the plate through a material or through air. Referring to FIG. 8A, a sectioned view of a chamber 805 is shown that comprises a first plate 810, a second plate 820 and an insulative barrier 875. A top and bottom of the instrument chassis can form sides 830, 840 or additional plates can be present. Further, only a single removable plate, e.g., plate 810, may be present with the other three sides of the chamber 805 being formed by the instrument chassis or housing. A heat sink 860 is shown as being disposed on an external surface 814 of the first plate 810. In use of the chamber 805, the column 850 can be heated during a chromatographic separation. To cool the column 850, a fan or other air circulator 870 can be switched on to create a cyclical air flow around the insulative barrier 875. As heat is transferred to the flowing air, heat can be transferred to the plates 810, 820 and removed from the chamber 805 to cool the column 850. The heat sink 860 can facilitate removal of heat by transferring heat away from the plate 810. If desired, a second heat sink 865 can be thermally coupled to the plate 820 as shown in FIG. 8B to further facilitate heat removal from the chamber 805 and column 850. Additional heat sinks could be present on the front and back surfaces (not shown) of the chamber if desired. While not shown, one or both heat sinks 860, 865 can also be thermally coupled to their own respective fan or a cooling element or both to facilitate removal of heat from the heat sink. The insulative barrier 875 may also be cooled to facilitate removal of heat from the chamber 805. Once the column 850 is cooled back to an initial starting temperature, the air circulation can be discontinued and another chromatography separation can be initiated.

Figure 8C:
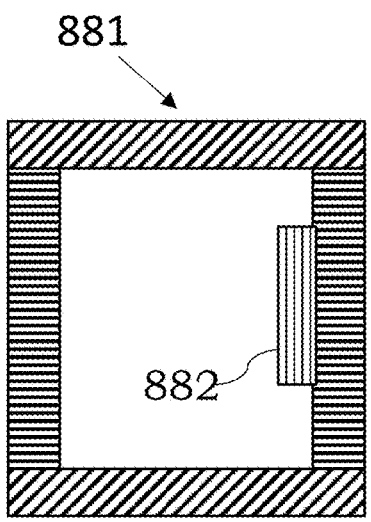
Figure 8D:
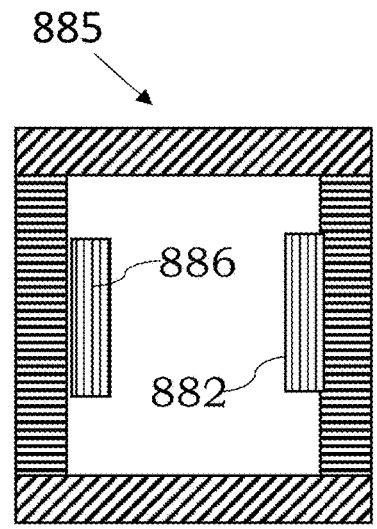
Figure 8E:
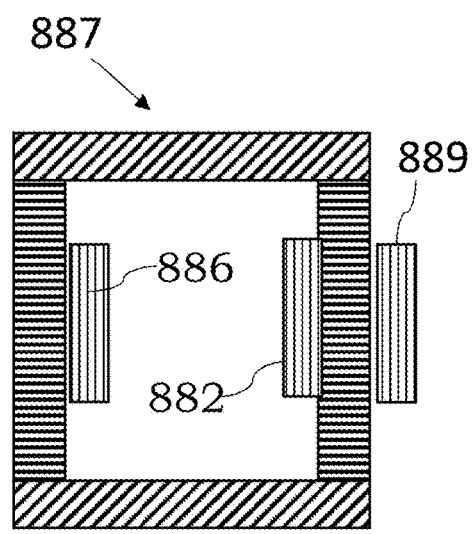
Figure 8F:
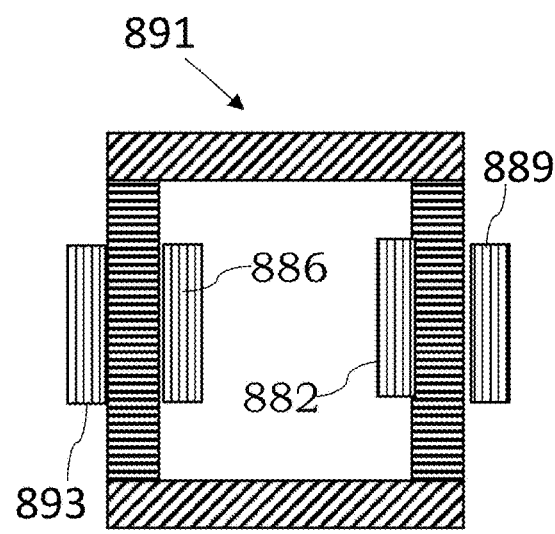

In certain configurations, one or more other surfaces of a chamber may comprise one or more heat sinks. For example, a heat sink may be present on one or more internal surfaces of a chamber, one or more external surfaces of a chamber or both. If desired, two or more heat sinks may be present on the same internal or external surface. For illustration purposes, FIG. 8C shows a chamber 881 comprising a heat sink 882 on an internal surface, and FIG. 8D shows a chamber 885 comprising heat sinks 882 and 886 on respective internal surfaces. FIG. 8E shows a chamber 887 comprising heat sinks 882 and 886 on respective internal surfaces and a heat sink 889 on an external surface. FIG. 8F shows a chamber 891 comprising heat sinks 882 and 886 on respective internal surfaces and heat sinks 889, 893 on respective external surfaces. While the heat sinks are shown as being the same size in FIGS. 8C-8F, different heat sinks can be present on different surfaces and where two or more heat sinks are present in or on any one chamber, the heat sinks need not have the same size, configuration or materials or thermal capacity.

Figure 9A:
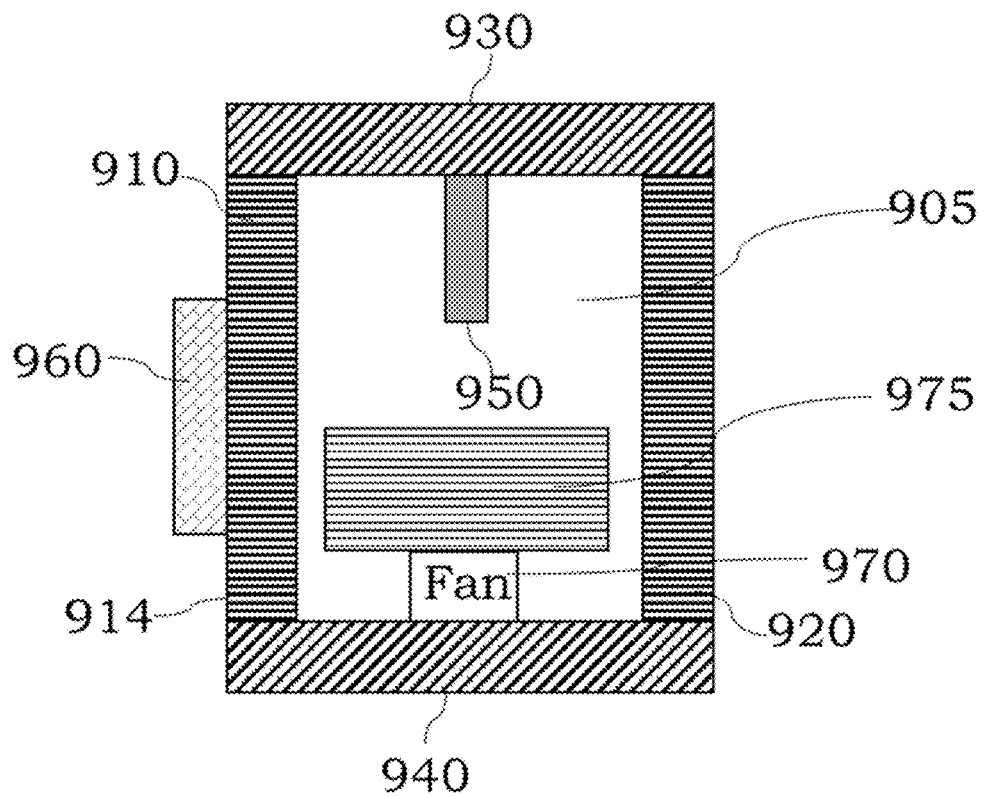
FIGS. 9A and 9B are illustrations showing an active cooling element thermally coupled to a plate, in accordance with some configurations.
Figure 9B:
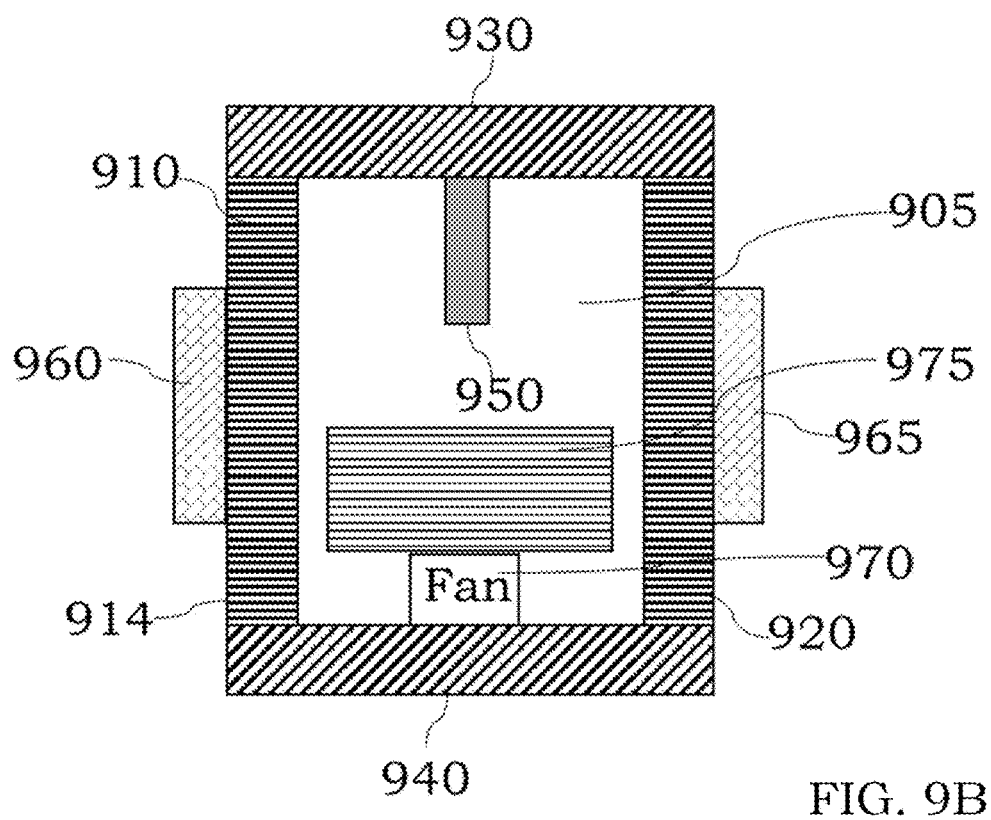

In certain embodiments, the plates described herein may be thermally coupled to an active cooling element to remove heat from the plates. The active cooling element may physically contact the plate or may be thermally coupled to the plate through a material or through air. Referring to FIG. 9A, a chamber 905 is shown that comprises a first plate 910, a second plate 920, and an insulative barrier 975. A top and bottom of the instrument chassis can form sides 930, 940 or additional plates can be present. Further, only a single removable plate, e.g., plate 910, may be present with the other three sides of the chamber 905 being formed by the instrument chassis or housing. An active cooling element 960 is shown as being disposed on an external surface 914 of the first plate 910. In use of the chamber 905, the column 950 can be heated during a chromatographic separation. To cool the column 950, a fan or other air circulator 970 can be switched on to create a cyclical air flow around the insulative barrier 975. As heat is transferred to the flowing air, heat can be transferred to the plates 910, 920 and removed from the chamber 905 to cool the column 950. The active cooling element 960 can reduce the temperature of the plate 910 to facilitate heat transfer from the circulating air to the plate 910. If desired, a second active cooling element 965 can be thermally coupled to the plate 920 as shown in FIG. 9B to further facilitate heat removal from the chamber 905 and column 950. The insulative barrier 975 may also be cooled to facilitate removal of heat from the chamber 905. Once the column 950 is cooled back to an initial starting temperature, the air circulation can be discontinued and another chromatography separation can be initiated.

Figure 10A:
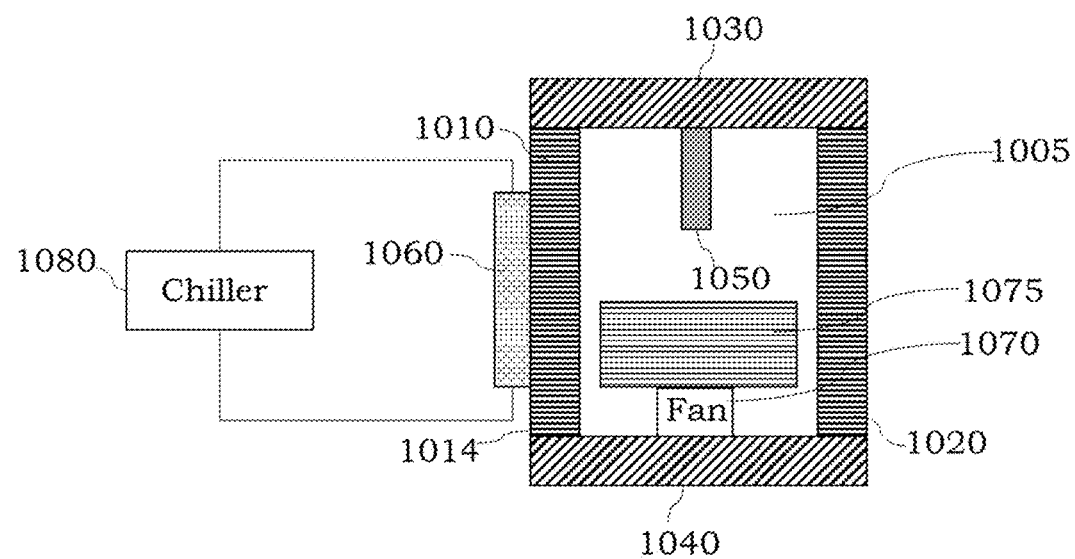
FIGS. 10A and 10B are illustrations showing a cooling jacket thermally coupled to a plate, in accordance with certain examples.
Figure 10B:
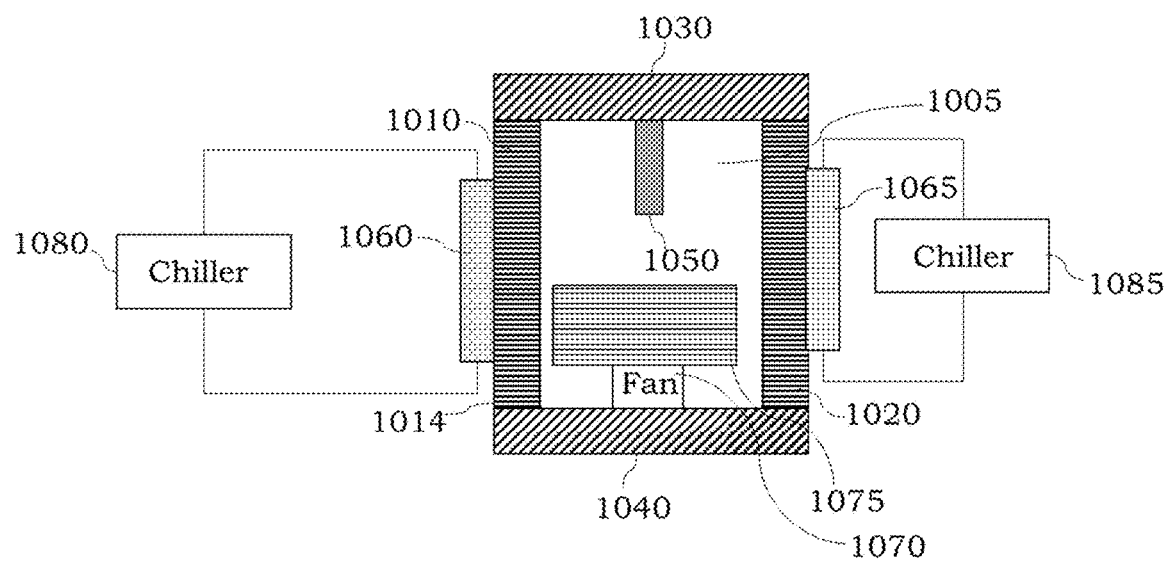

In other embodiments, the plates described herein may be thermally coupled to a cooling jacket that may comprise a circulating fluid. The cooling jacket may physically contact the plate or may be thermally coupled to the plate through a material or through air. Referring to FIG. 10A, a chamber 1005 is shown that comprises a first plate 1010, a second plate 1020, an insulative barrier 1075 and a fan 1070. A top and bottom of the instrument chassis can form sides 1030, 1040 or additional plates can be present. Further, only a single removable plate, e.g., plate 1010, may be present with the other three sides of the chamber 1005 being formed by the instrument chassis or housing. A cooling jacket 1060 is shown as being disposed on an external surface 1014 of the first plate 1010. The cooling jacket 1060 is fluidically coupled to a chiller 1080 that can circulate a cooling flood through the cooling jacket 1060. In use of the chamber 1005, the column 1050 can be heated during a chromatographic separation. To cool the column 1050, a fan or other air circulator 1070 can be switched on to create a cyclical air flow around the insulative barrier 1075. As heat is transferred to the flowing air, heat can be transferred to the plates 1010, 1020 and removed from the chamber 1005 to cool the column 1050. The cooling jacket 1060 can reduce the temperature of the plate 1010 to facilitate heat transfer from the circulating air to the plate 1010. If desired, a second cooling jacket 1065 and second chiller 1085 can be thermally coupled to the plate 1020 as shown in FIG. 10B to further facilitate heat removal from the chamber 1005 and column 1050. If desired, one or more of the cooling jacket can be thermally coupled to the insulative barrier 1075, or the insulative barrier 1075 may otherwise be cooled. Once the column 1050 is cooled back to an initial starting temperature, the air circulation can be discontinued and another chromatography separation can be initiated.

Figure 11A:
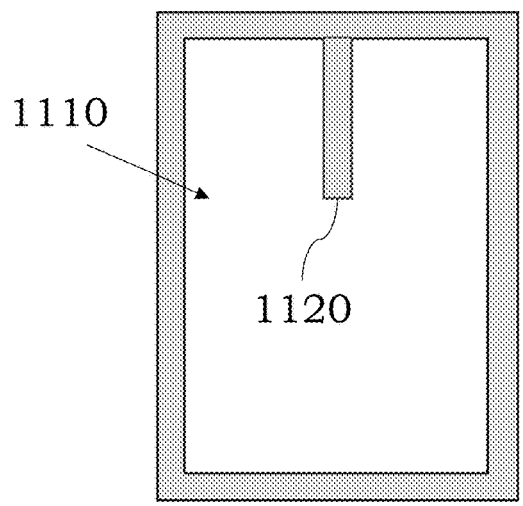
FIGS. 11A, 11B and 11C are illustration showing cross-sections of certain chamber shapes, in accordance with some embodiments.
Figure 11B:
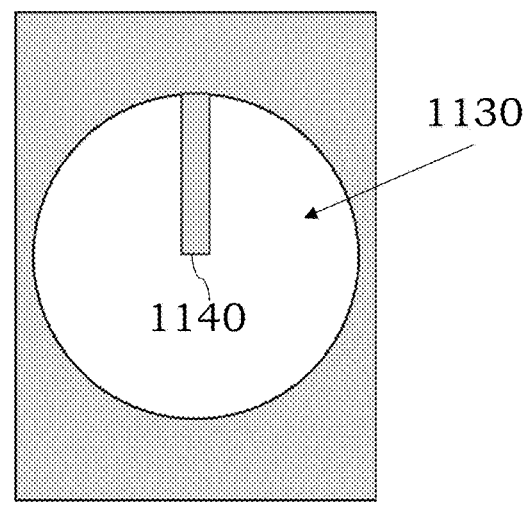
Figure 11C:
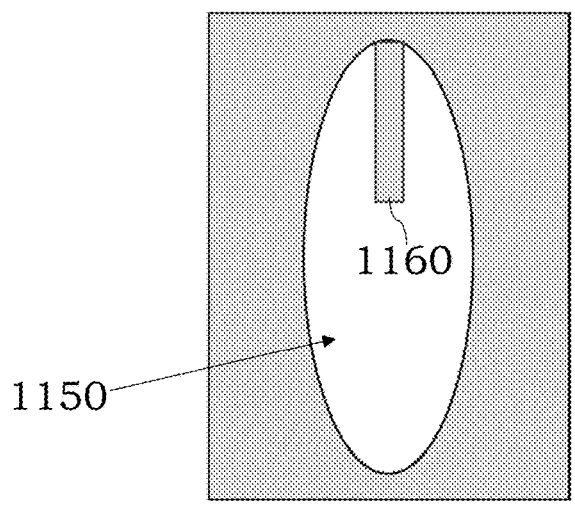

In certain embodiments, the shape of the chamber and plates can be selected to provide a desired air flow through the chamber. For example, a thermally isolated chamber 1110 may adopt a rectangular shape as shown in FIG. 11A. If desired, a closed channel or tube with or without fins may function as a chamber or a portion thereof. For example, a tube protruding from a flat surface can increase the surface area to facilitate heat removal. In certain configurations, the chamber itself can be formed by one or more plates or by a plate in combination with the housing or chassis of the instrument. In certain configurations where a single plate is present, the single plate is desirably removable so access to the interior of the chamber is possible to permit installation and removal of a chromatography column 1120. In some configurations, the interior surfaces of the chamber may be rounded or have soft bends to improve air flow within the chamber. For example and referring to FIG. 11B, a chamber 1130 comprising a round shape may provide for improved and less turbulent air flow that can be provided to a column 1140. This less turbulent air flow can result in an increased cooling rate of the column 1140. In other configurations, the chamber may adopt other shapes including an elliptical chamber 1150 with a column 1160 as shown in FIG. 11C. No particular chamber shape is necessarily required, but depending on the configuration and dimensions of the chromatography column, it may be desirable to select and use certain chamber shapes to facilitate heat removal from the chromatography column. While not shown, an insulative barrier is typically present in the chambers 1110, 1130, and 1150 to form a cyclical air flow path and thermally isolate the columns 1120, 1140 and 1160, respectively, from the other components in the chambers 1110, 1130 and 1150.

Figure 12:
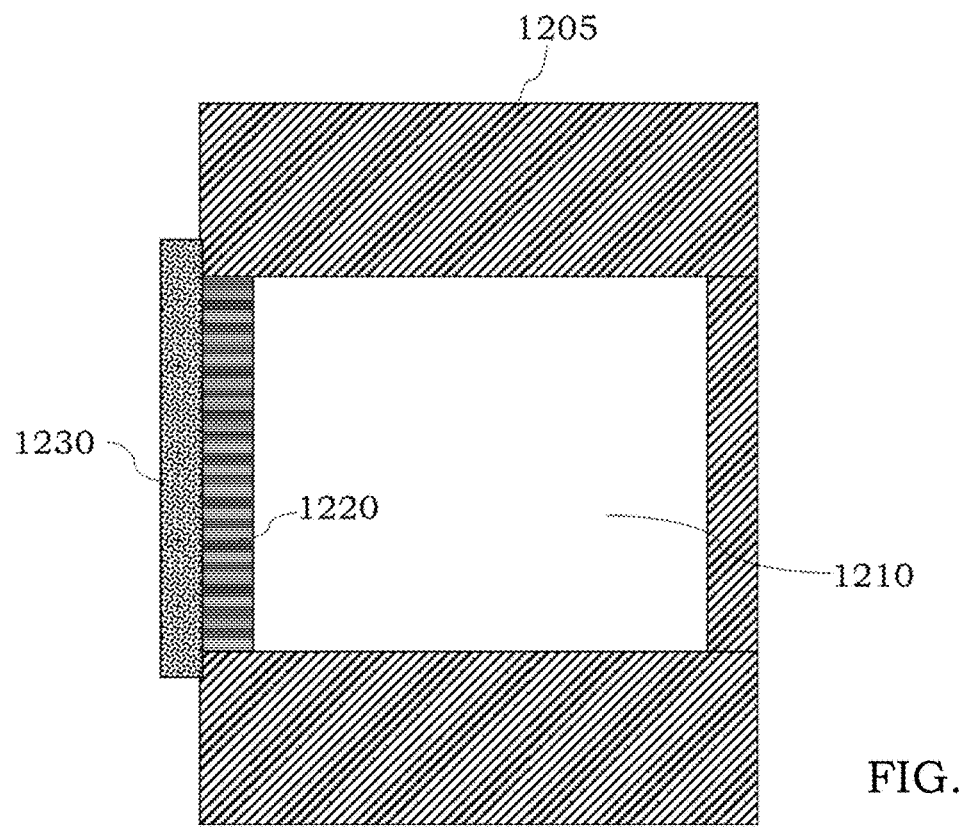
FIG. 12 is an illustration showing an insulating material thermally coupled to a plate, in accordance with certain examples.

In certain embodiments, the chambers described herein may comprise one or more insulating materials on an external surface. For example, the insulating materials can be present to reduce heat transfer from the one or more plates to other components within the instrument and/or may be present to direct heat out of only one side of the chamber. In some examples, the insulating material may comprise one or more of a glass, a foam, a wool, a fabric, a felt, an aerogel or other materials. Referring to FIG. 12, a chamber 1210 is shown that comprises a first plate 1220 that is coupled to sides of an instrument chassis or housing 1205. An insulating material 1230 is shown as being thermally coupled to the first plate 1220 and acts to reduce heat transfer from the plate 1220 to other components in the instrument. The insulating material can be present as a separate layer positioned adjacent to the plate 1220 or may be present as a material layer that is coupled to the plate 1220, e.g., through an adhesive or other material. A heat sink, heating element or cooling element can be present between the plate 1220 and the insulating layer 1230 is desired. While not shown, an insulative barrier is typically present in the chamber 1210 to provide and/or form a cyclical air flow path to cool a column (also not shown). If desired, the insulating layer 1230 could be thermally coupled to a heat pipe, duct or other structure that penetrates into the insulating layer 1230 and is thermally coupled to the plate 1220 so heat removal is facilitated through the heat pipe, duct or other structure.

Figure 13A:
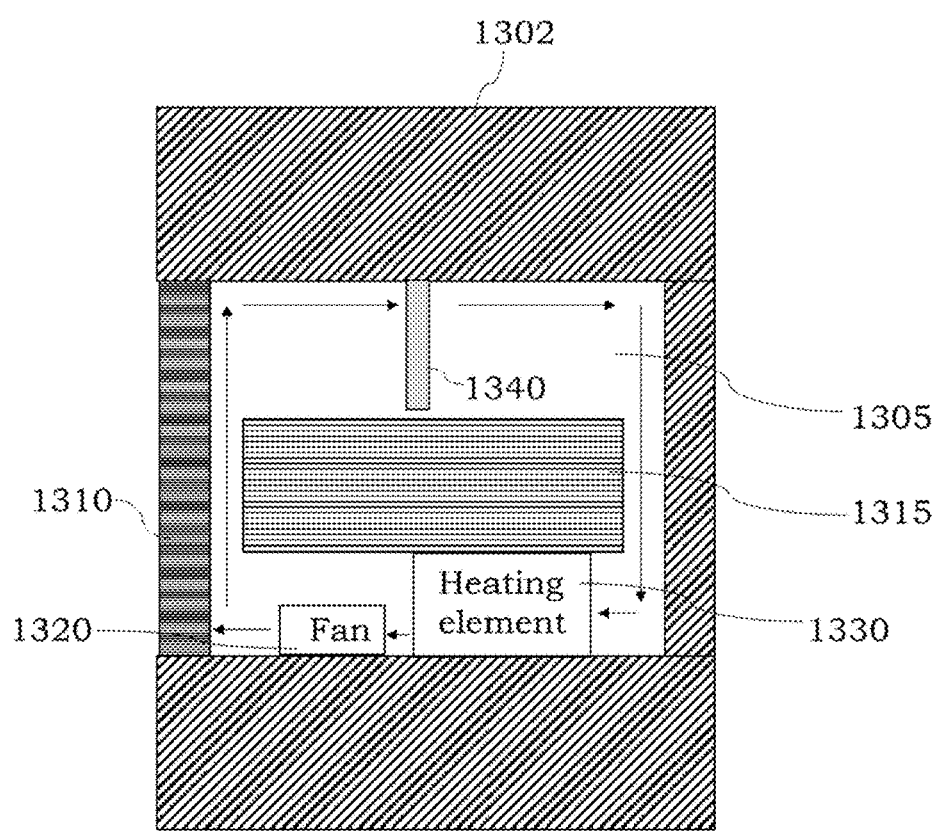
FIGS. 13A and 13B are illustrations showing a heating element within a chamber, in accordance with some embodiments.
Figure 13B:
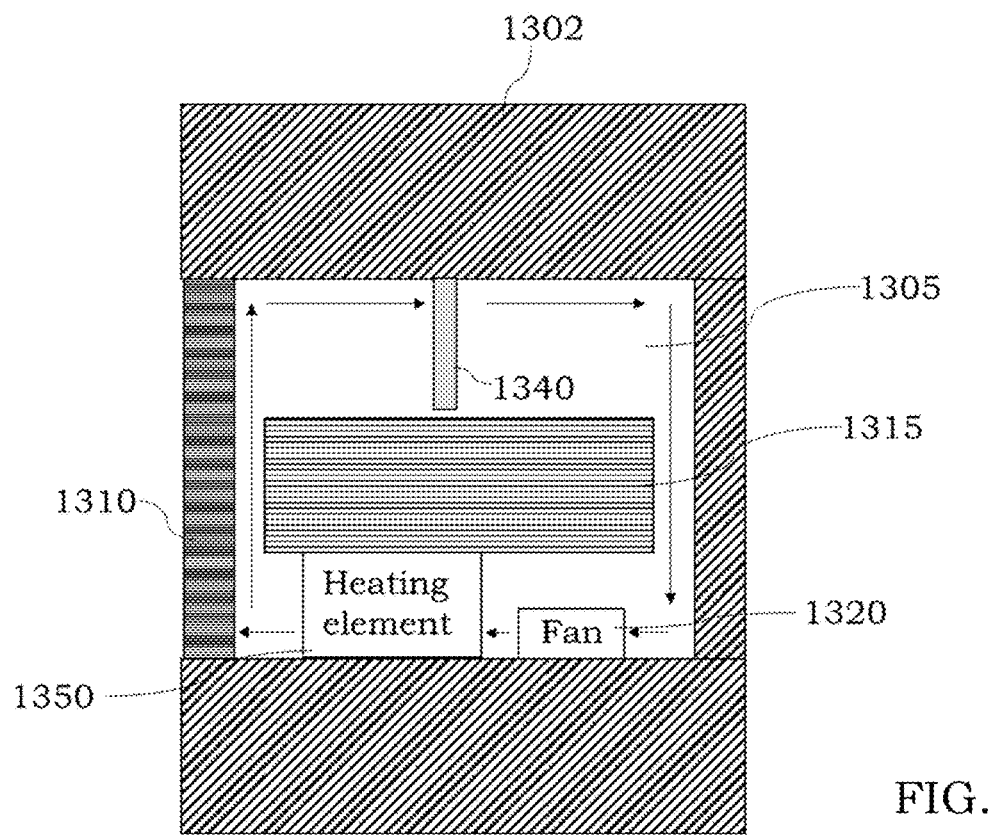

In certain embodiments, the chamber itself may comprise a respective heater or heating element to heat up the circulating air to heat the chromatography column. In some examples, the heating element can be thermally coupled to a fan or air circulator in the chamber to facilitate transfer of heat to the chromatography column. Referring to FIG. 13A, a chamber 1305 is shown that comprises a first plate 1310 and an insulative barrier 1315. The other sides of the chamber 1305 are formed from an instrument chassis or housing 1302. A fan 1320 and a heating element 1330 positioned upstream or in front of the fan, with respect to air flow (see arrows), are shown. The fan can draw heat from the heating element 1330 into the fan 1320 and provide a heated air output around the periphery of the barrier 1315 and to a chromatography column 1340. The temperature provided by the heating element 1330 can change during a chromatographic separation to change the temperature of the chromatography column 1340. Once the chromatographic separation is complete, the heating element 1330 may be switched off to permit cooling of the column within the chamber 1305. In some embodiments, the heating element is positioned downstream or behind the fan such that air from the fan contacts the heating element to heat the circulating air flow. Referring to FIG. 13B, a heating element 1350 is shown that is positioned downstream of the fan 1320. As air from the fan 1320 is blown over or through the heating element 1350, the air is heated and provided to the column 1340 around the periphery of the barrier 1315. This heated air can be provided to a chromatography column to heat the column. If desired, the heating element 1330 or 1350 can be used to heat the chromatography column instead of using an oven. For example, a chromatography system that does not include an oven can include a heating element within a thermally isolated chamber to heat the chromatography column.

Figure 14A:
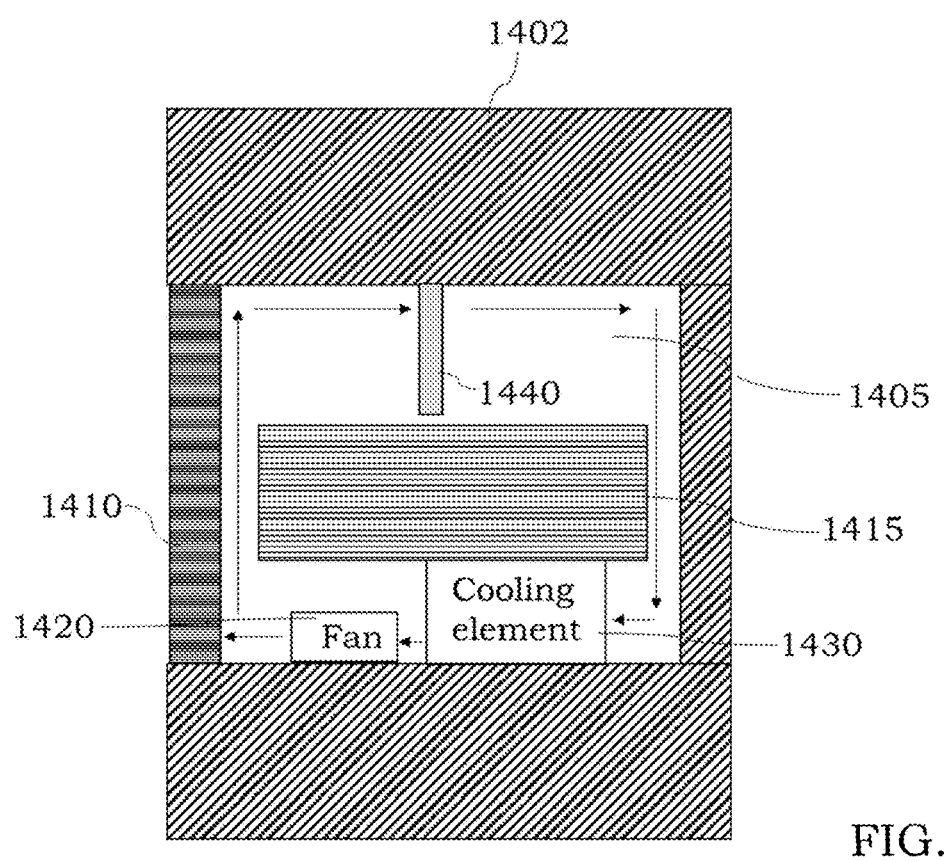
FIGS. 14A and 14B are illustrations showing a cooling element within a chamber, in accordance with some embodiments.
Figure 14B:
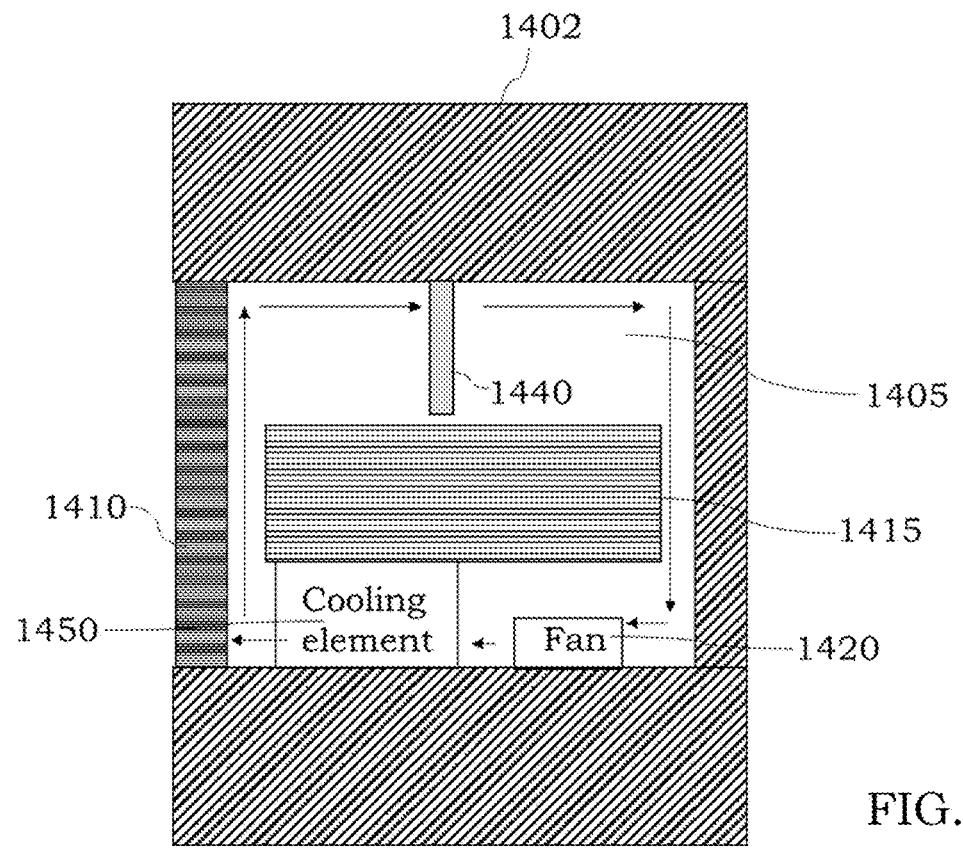

In certain embodiments, the chamber itself may comprise a respective cooler or cooling element to cool the circulating air to cool the chromatography column. In some examples, the cooling element can be thermally coupled to a fan or air circulator in the chamber to facilitate circulation of cooled air to the chromatography column. Referring to FIG. 14A, a chamber 1405 is shown that comprises a first plate 1410 and an insulative barrier 1415. The other sides of the chamber 1405 are formed from an instrument chassis or housing 1402. A fan 1420 and a cooling element 1430 positioned upstream or in front of the fan, with respect to air flow (see arrows), are shown. The fan can draw cooler air from the cooling element 1430 into the fan 1420 and provide a cooled air output to a chromatography column 1440 as air flows around the insulative barrier 1415 and to the column 1440. The temperature provided by the cooling element 1430 can change or may be constant. Once the column 1440 is cooled back to a desired temperature, the cooling element 1430 may be switched off and another chromatographic separation may begin. In some embodiments, the cooling element is positioned downstream or behind the fan such that air from the fan contacts the cooling element to cool the circulating air flow. Referring to FIG. 14B, a cooling element 1450 is shown that is positioned downstream of the fan 1420. As air from the fan 1420 is blown over or through the cooling element 1450, the air is cooled. This cooled air can be flow around the insulative barrier 1415 and to the chromatography column 1440 to cool the column. If desired, the cooling element 1430 or 1450 can be used to cool a chromatography column that is not heated using an oven. For example, a chromatography system that does not include an oven can include a cooling element in a thermally isolated chamber to cool the chromatography column.

Figure 15A:
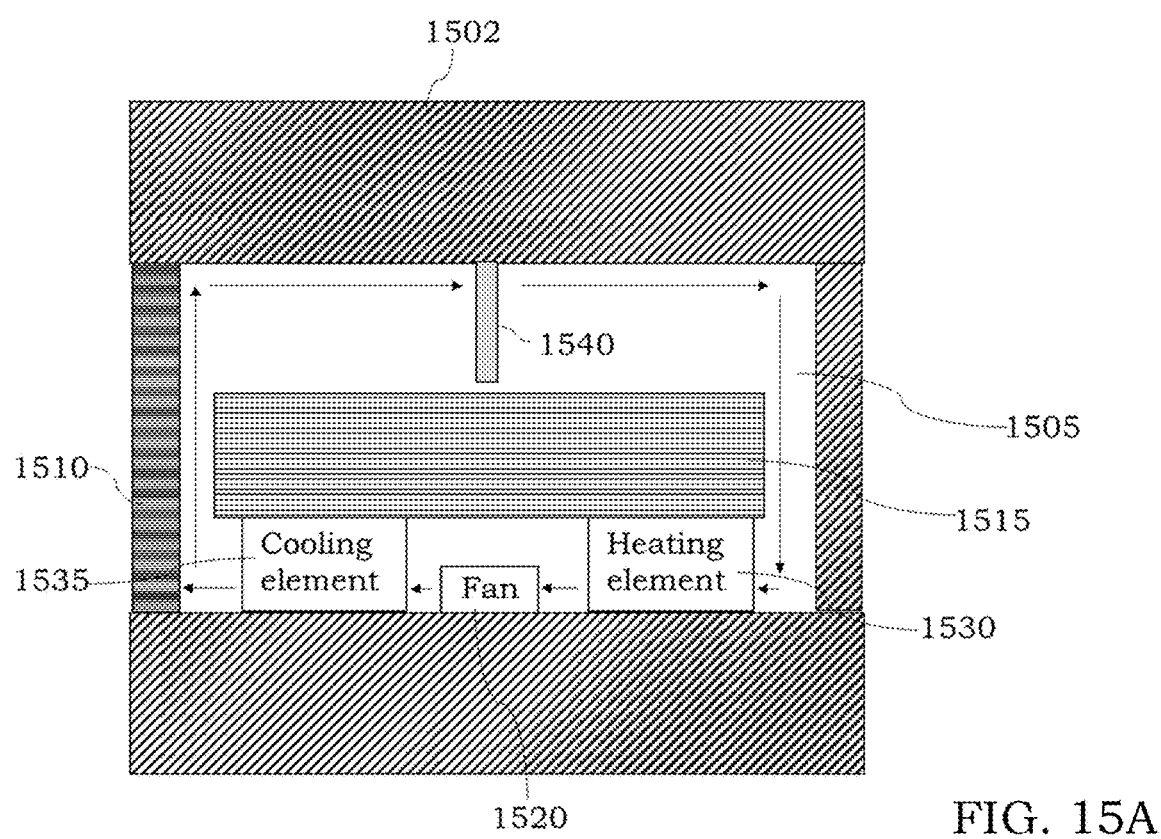
FIGS. 15A and 15B are illustrations showing a heating element and a cooling element within a chamber, in accordance with some embodiments.
Figure 15B:
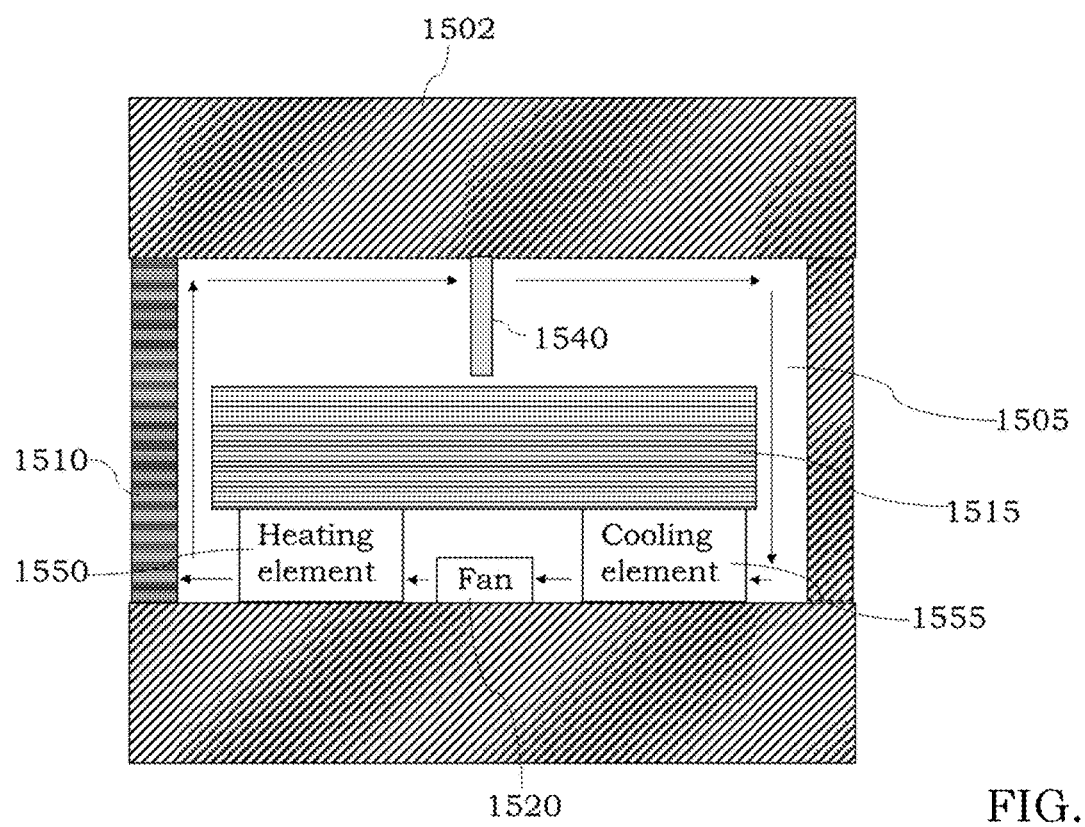

In some embodiments, the chambers described herein may comprise a heating element and a cooling element. Referring to FIG. 15A, in some examples, the heating element can be thermally coupled to a fan or air circulator in the chamber to facilitate transfer of heat to the chromatography column. The cooling element can also be thermally coupled to the same fan or air circulator (or its own respective fan or air circulator) to cool the chromatography column after it has been heated. Referring to FIG. 15A, a chamber 1505 is shown that comprises a first plate 1510 and an insulative barrier 1515. The other sides of the chamber 1505 are formed from an instrument chassis or housing 1502. A fan 1520 and a heating element 1530 positioned upstream or in front of the fan, with respect to air flow (see arrows), are shown. A cooling element 1535 is shown being positioned downstream of the fan 1520. The fan 1520 can draw heat from the heating element 1530 into the fan 1520 and provide a heated air output to a chromatography column 1540 in an air flow path formed at least in part by the insulative barrier 1515. During heating, the cooling element 1535 is typically switched off. The temperature provided by the heating element 1530 can change during a chromatographic separation to change the temperature of the chromatography column 1540. Once the chromatographic separation is complete, the heating element 1530 may be switched off, and the cooling element 1535 can be switched on to permit cooling of the column within the chamber 1505. The arrangement of the heating element 1530 and the cooling element 1535 could be reversed if desired. For example and referring to FIG. 15B, a heating element 1550 is shown that is positioned downstream of the fan 1520. A cooling element 1555 is shown as being positioned upstream of the fan. If desired, the heating elements 1530, 1550 and the cooling elements 1535, 1555 can be used to heat/cool the chromatography column instead of using an oven. For example, a chromatography system that does not include an oven can include a heating element and a cooling element within a thermally isolated chamber to heat and cool the chromatography column.

Figure 16A:
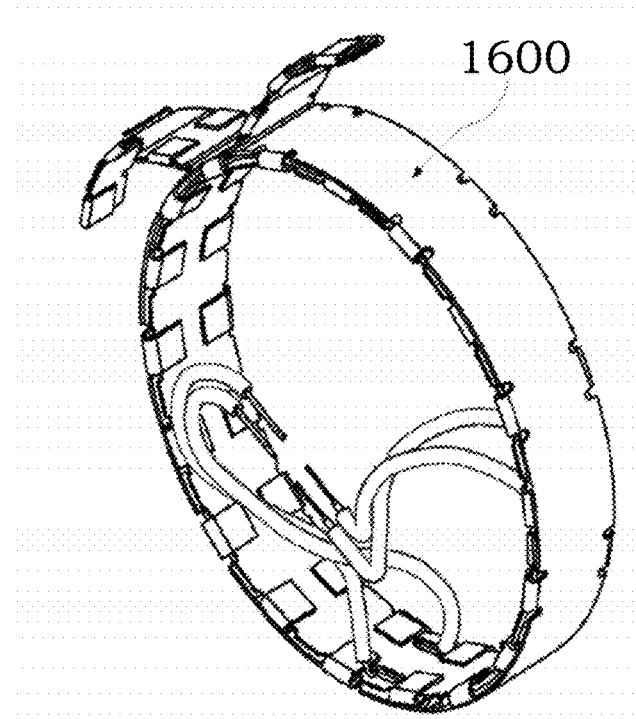
FIGS. 16A, 16B, 16C and 16D are illustrations showing components of a column-heater assembly, in accordance with certain embodiments.
Figure 16B:
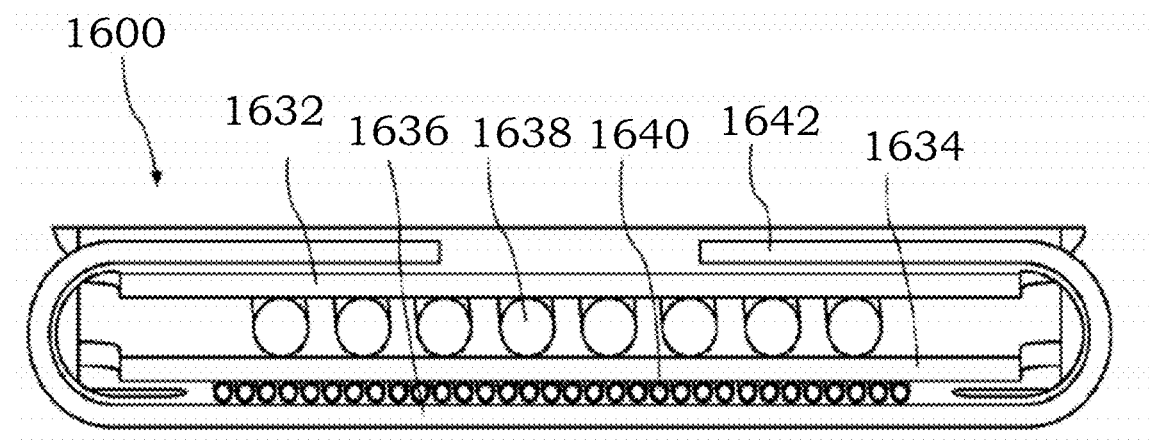

In some embodiments, the column used in the chambers described herein may be present in, or part of, a column-heater module assembly. For example, a heater or heating element can physically contact a column to heat the column during the chromatographic separation. The heater may be switched off after the chromatographic separation ends to permit the cyclical air flow to cool the column. One illustration of a column-heater module is shown in FIGS. 16A, 16B, 16C and 16D. A heater-module 1600 may comprise a cylindrical column, capillary column or other types of columns. In one configuration, the column-heater module 1600 may comprise an inner column ring 1632, a middle column ring 1634, and an outer column ring 1636. Tabs 1642 may also be provided on the outer column ring 1636 so that they may be folded over the inner column ring 1632 and hold the column-heater module 1600 together in a desired shape. The inner column ring 1632, middle column ring 1634, and outer column ring 1636 may be comprised of a thermally conductive material such as those described herein in connection with the plates. As shown in FIG. 16B, a heating wire 1638 may be disposed between the inner column ring 1632 and the middle column ring 1634. Furthermore, a single layer of capillary tubing 1640 may be disposed between the middle column ring 1634 and the outer column ring 1636. A temperature sensor may also be present to determine the temperature of the column.

Figure 16C:
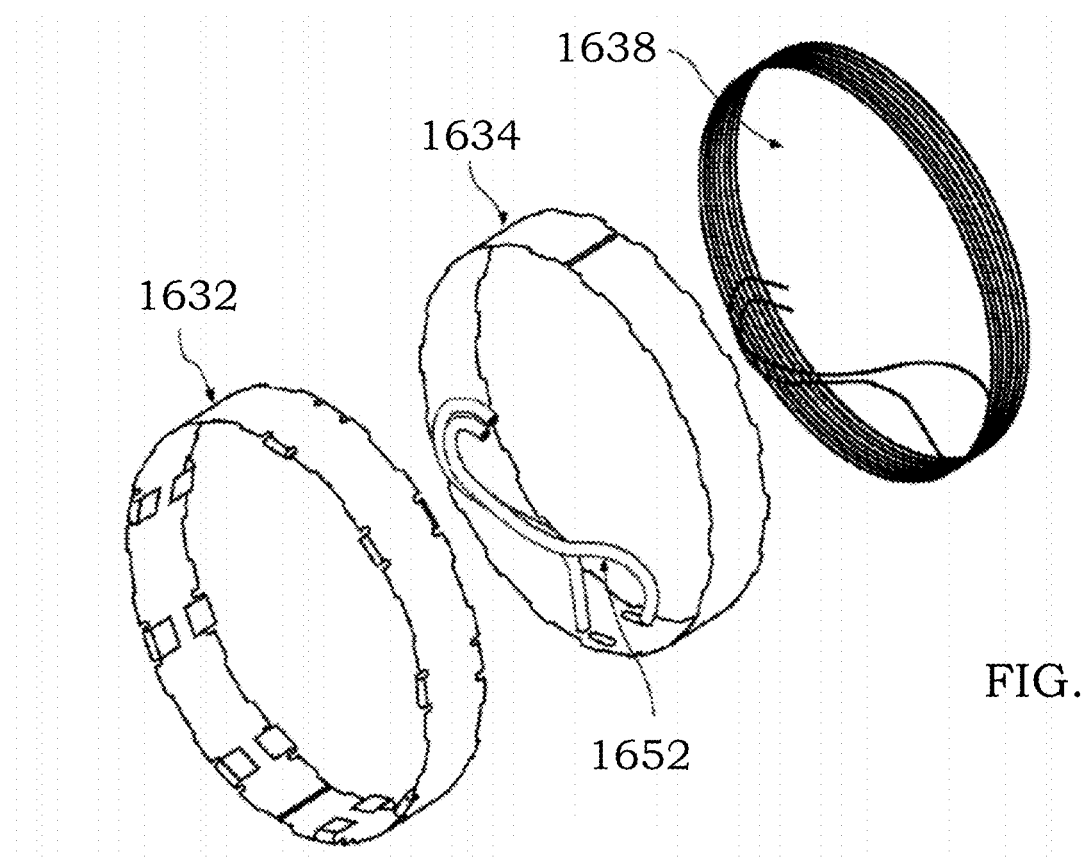
Figure 16D:
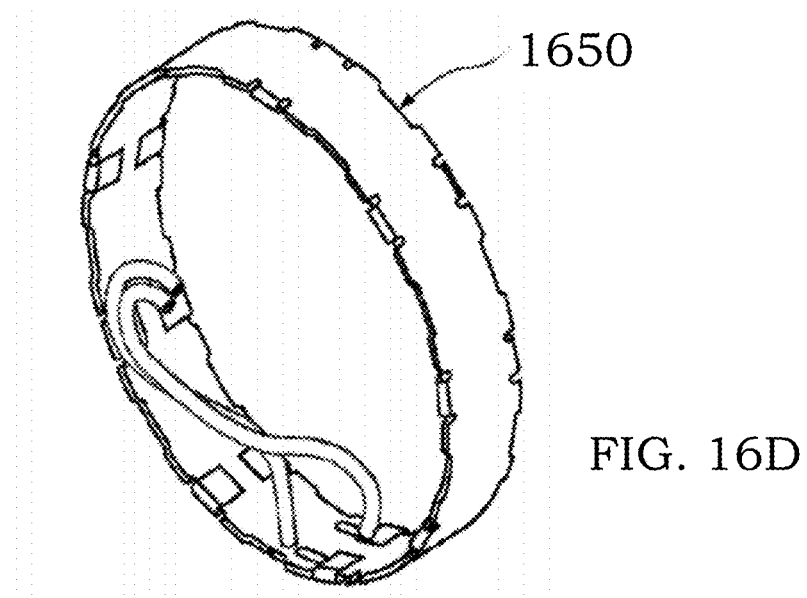

In certain embodiments, the heating wire 1638 can be disposed between the inner column ring 1632 and the middle column ring 1634 so that there is heating of an inner surface of the middle column ring 1634. A material can be selected for the middle column ring 1634 such that heat may be uniformly transferred through the middle column ring 1634 to an outer surface thereof. The exact number of times that the heating wire 1638 is wound around the inner column ring 1632 can vary. In some embodiments, the heating of the inner surface of the middle column ring 1634 that is disposed over the heating wire 1638 is substantially uniform. Furthermore, the heating wire 1638 can overlap as long as it does not interfere with the heating of the inner surface of the middle column ring 1634. The heating wire 1638 may be any appropriate thickness and material. For example, the heating wire 1638 can be 27 AWG or other suitable wire gauges. In some instances, the column 1632 may include capillary tubing of approximately 0.10 mm ID and be approximately 5.5 meters in length. It should be understood that these dimensions are for illustration purposes only and are not limiting of the dimensions that may be used. In some instances, heater wire sleeves 1652 can be used to cover a column-heater assembly 1650 as shown in FIGS. 16C and 16D. Additional suitable components that can be used in a column-heater assembly are described, for example, in WO2018/005679 published on Jan. 4, 2018.

Figure 17:
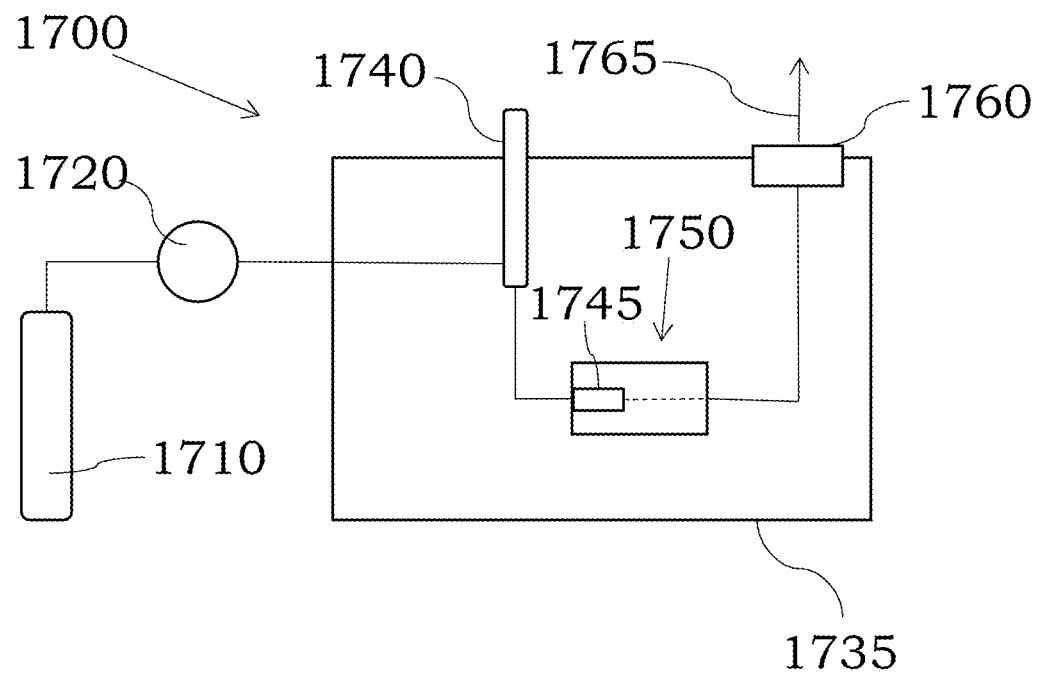
FIG. 17 is an illustration showing certain components of a gas chromatograph, in accordance with certain embodiments.

In certain embodiments, the chambers described herein are typically present in a gas chromatography (GC) system or gas chromatograph. Referring to FIG. 17, a GC system 1700 comprises a carrier gas source 1710 fluidically coupled to a pressure regulator 1720 through a fluid line. The pressure regulator 1720 is fluidically coupled to a GC column 1745 in a chamber 1750 as described herein, e.g., a thermal isolation chamber. The GC column 1745 is also fluidically coupled to the injector 1740. Sample is injected into the injector 1740 and vaporized using a heated injector, an oven 1735, a heating element or a column-heater module as described above, for example, in connection with FIGS. 16A-16D. The column 1745 in the chamber 1750 separates the analyte species into individual analyte components and permits exit of those analyte species through an outlet of the column 1745 and to a detector 1760. After detection, the remaining sample can be vented as shown by arrow 1765. During the chromatographic separation, the column 1745 is often heated from a starting temperature to a final temperature. The temperature change can be linear, stepped or take other forms. Once all analyte exits the column 1745, the column 1745 can then be cooled by switching on a fan (not shown) on the chamber 1750 to transfer heat from the column 1745 to one or more plates of the chamber 1750. The cyclical air flow through the chamber 1750 can remove heat from the column 1745 and transfer it to the one or more plates. Once the temperature of the column 1745 is returned to the starting temperature, then another chromatographic separation can be initiated by injecting a new sample into the injector 1740 and repeating the process. While not shown, a thermocouple or temperature sensor can be present to monitor the temperature of the column.

In some embodiments, the detector 1760 may be any detector commonly used in gas chromatography including, but not limited to, a flame ionization detector, a thermal conductivity detector, a nitrogen phosphorous detector, an electron capture detector, a flame photometric detector, a photoionization detector, an electrolytic conductivity detector, a Daly detector, a mass spectrometer or other suitable detectors commonly found in or used with chromatography systems. If desired, the total amount of analyte may be determined or the particular amount of one or more analyte components can be determined, e.g., by using conventional standard curve techniques and standards.

Figure 18:
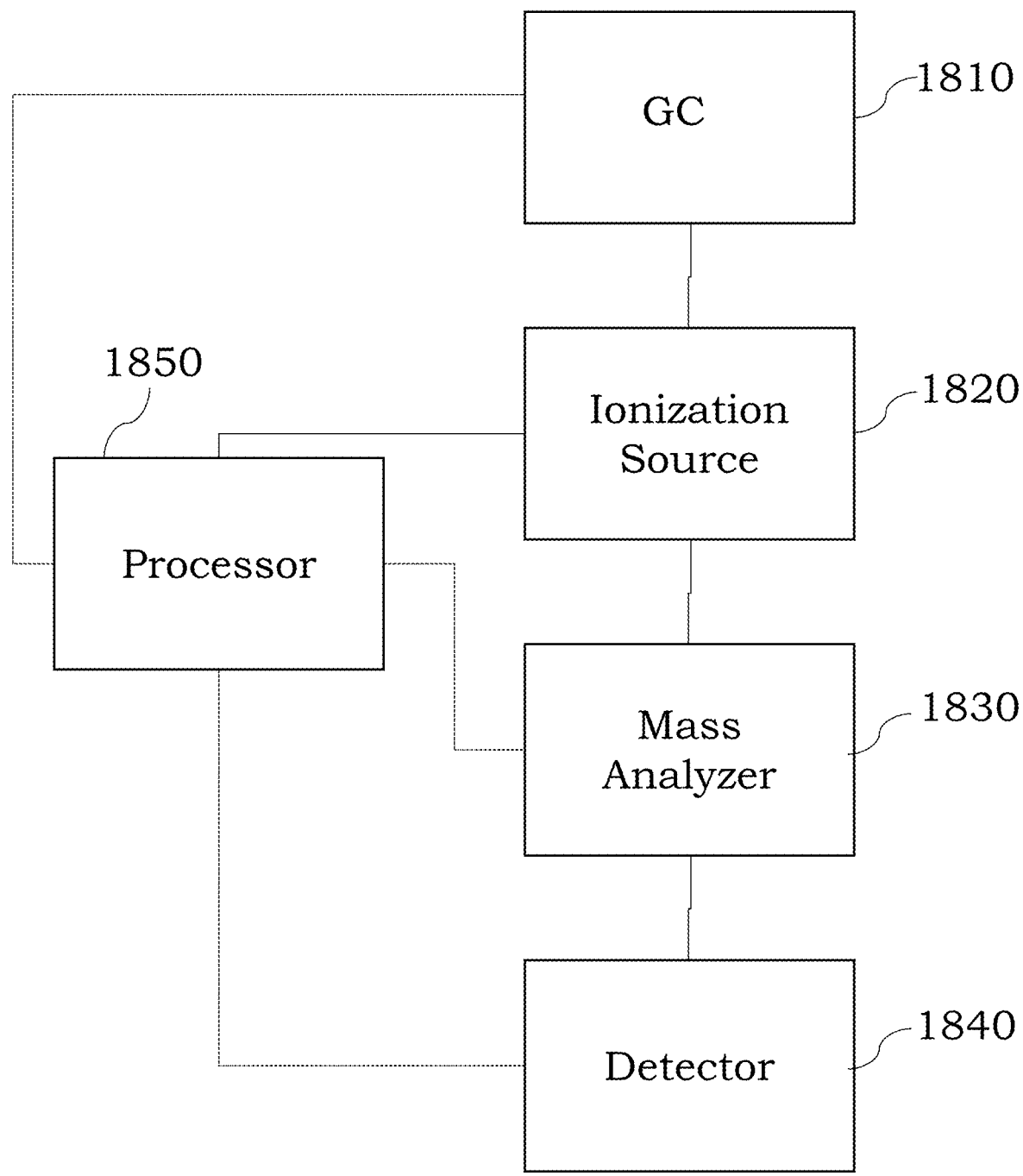
FIG. 18 is a block diagram showing a gas chromatography hyphenated to a mass spectrometer, in accordance with certain examples.

In some examples, a GC comprising a chamber as described herein can be hyphenated or conjugated to a mass spectrometer. A block diagram is shown in FIG. 18, where a GC 1810 is shown as being fluidically coupled to an ionization source 1820. The ionization source 1820 is fluidically coupled to a mass analyzer 1830. The mass analyzer 1830 is fluidically coupled to a detector 1840. Separated analyte can be provided from the GC 1810 to the ionization source 1820, which can ionize the analyte and provide ionized analyte to the mass analyzer 1830 for filtering, selection or both. In certain embodiments, the exact ionization source used may vary. In certain configurations, the ionization source 1820 comprises one or more of an inductively coupled plasma, a discharge plasma, a capacitively coupled plasma, a microwave induced plasma, a glow discharge ionization source, a desorption ionization source, an electrospray ionization source, an atmospheric pressure ionization source, atmospheric pressure chemical ionization source, a photoionization source, an electron ionization source, and a chemical ionization source. Other ionization sources and combinations of ionization sources may also be used.

In certain examples, the mass analyzer 1830 may comprise one or more rod assemblies such as, for example, a quadrupole or other rod assembly. The mass analyzer 1830 may further comprise one or more ion guides, collision cells, ion optics and other components that can be used to sample and/or filter an entering beam received from the ionization source 1820. The various components can be selected to remove interfering species, remove photons and otherwise assist in selecting desired ions from the entering ions. If desired, ion optics, collision cells, ion guides and other components may also be present. In some examples, the mass analyzer 1830 may be, or may include, a time of flight device. In some instances, the mass analyzer 1830 may comprise its own radio frequency generator. In certain examples, the mass analyzer 1830 can be a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. If desired, the mass analyzer 1830 may comprise two or more different devices arranged in series, e.g., tandem MS/MS devices or triple quadrupole devices, to select and/or identify the ions that are received from the chromatograph. The mass analyzer can be fluidically coupled to a vacuum pump to provide a vacuum used to select the ions in the various stages of the mass analyzer. The vacuum pump is typically a roughing or foreline pump, a turbomolecular pump or both. Various components that can be present in a mass analyzer are described, for example, in commonly owned U.S. Pat. Nos. 10,032,617, 9,916,969, 9,613,788, 9,589,780, 9,368,334, 9,190,253 and other patents currently owned by PerkinElmer Health Sciences, Inc. (Waltham, MA) or PerkinElmer Health Sciences Canada, Inc. (Woodbridge, Canada).

In some examples, the detector 1840 can be used to detect the ions filtered or selected by the mass analyzer. The detector may be, for example, any suitable detection device that may be used with existing mass spectrometers, e.g., electron multipliers, Faraday cups, coated photographic plates, scintillation detectors, multi-channel plates, etc., and other suitable devices that will be selected by the person of ordinary skill in the art, given the benefit of this disclosure. Illustrative detectors that can be used in a mass spectrometer are described, for example, in commonly owned U.S. Pat. Nos. 9,899,202, 9,384,954, 9,355,832, 9,269,552, and other patents currently owned by PerkinElmer Health Sciences, Inc. (Waltham, MA) or PerkinElmer Health Sciences Canada, Inc. (Woodbridge, Canada).

In certain instances, the system may also comprise a processor 1850, which typically take the forms of a microprocessor and/or computer and suitable software for analysis of samples introduced into the mass analyzer 1830. While the processor 1850 is shown as being electrically coupled to the GC 1810, the ionization source 1820, the mass analyzer 1830 and the detector 1840, it can also be electrically coupled to the other components as well. In some embodiments, the processor 1850 can be present, e.g., in a controller or as a stand-alone processor, to control and coordinate operation of the system for the various modes of operation using the system. For this purpose, the processor 1850 can be electrically coupled to each of the components of the system, e.g., one or more pumps, one or more voltage sources, rods, etc.

In certain configurations, the processor 1850 may be present in one or more computer systems and/or common hardware circuitry including, for example, a microprocessor and/or suitable software for operating the system, e.g., to control the voltages of the ionization source, pumps, mass analyzer, detector, etc. In some examples, any one or more components of the system can include its own respective processor, operating system and other features to permit operation of that component. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibrations and data during operation of the system in the various modes. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. The processor 1850 typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable non-volatile recording medium in which codes can be stored that can be used by a program to be executed by the processor or information stored on or in the medium to be processed by the program. The medium may, for example, be a hard disk, solid state drive or flash memory. Typically, in operation, the processor causes data to be read from the non-volatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

In certain configurations, the exact materials present in the chromatography column can vary depending on the analytes to be separated. The materials may be hydrophilic, hydrophobic or combinations of hydrophilic and hydrophobic materials. The housing of the column may be glass, stainless steel or one of the thermally conductive materials described in connection with the plates used in the chambers. In certain embodiments, the column may take the form of a coil, a cylinder, a capillary, a separation chip, a separation cartridge or other forms. The exact mobile phase used can depend, at least in part, on the analytes to be separated and the column stationary phase materials. Illustrative mobile phases where GC is performed include, but are not limited to, nitrogen, helium, hydrogen, argon, carbon dioxide, ambient environment air. For non-GC applications, aqueous and non-aqueous liquids can be used as a mobile phase.

In certain configurations, many different analytes can be separated using the systems and chambers described herein including, but not limited to, pharmaceuticals, petroleum products, chemical warfare agents, arsenics/arsenates, metals, non-metals, hydrocarbons, e.g., hydrocarbons with one or more carbon atoms, aromatics, and other organic and inorganic materials. In some instances, the systems can be used to separate and detect polyaromatic hydrocarbons, phenolic compounds, phthalate esters, organo-chloride, organo-phosphorus and pyrethroid pesticides and herbicides. The samples often include volatile organic compounds (VOCs) or semi-volatile organic compounds (SVOCs).

Figure 19A:
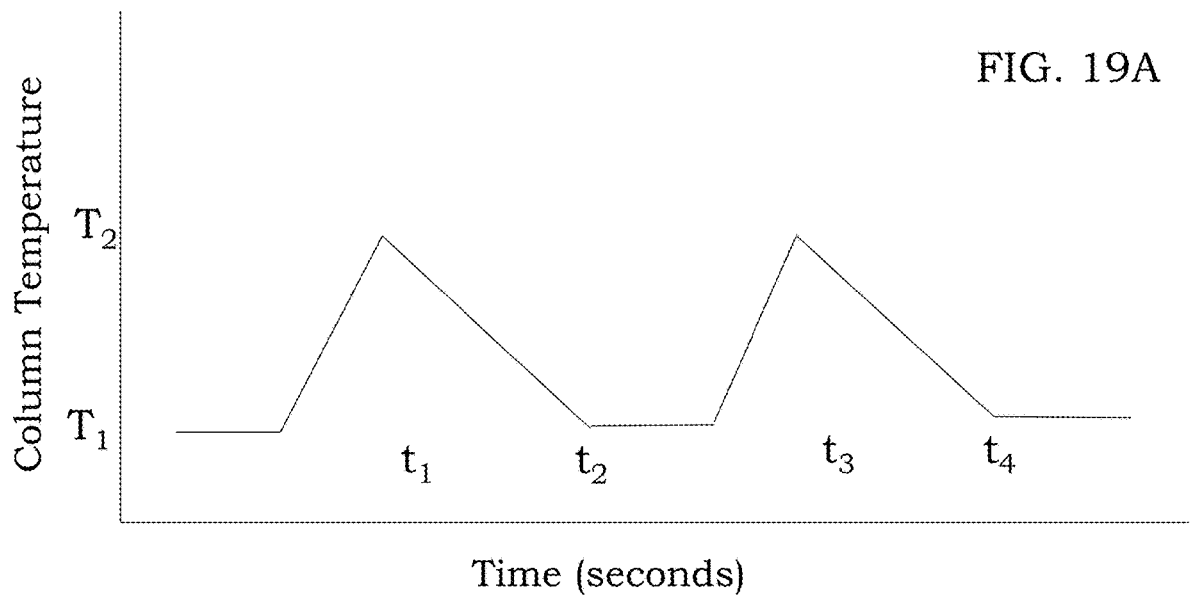
FIG. 19A is a graph showing a temperature gradient.
Figure 19B:
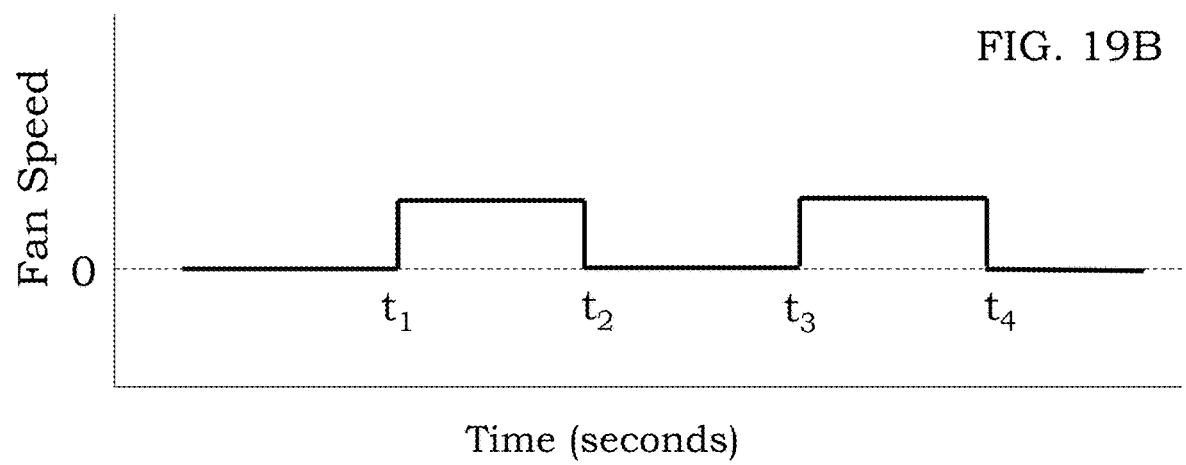
FIG. 19B is a graph showing a fan speed, in accordance with certain embodiments.

In certain embodiments, a graphical representation of column temperature as a function of time is shown in FIG. 19A. A fan speed of a fan in the chamber as a function of time is shown in FIG. 19B. During the chromatographic separation, the temperature of the column is often increased from an initial temperature $T_1$ to a final temperature $T_2$ to facilitate desorption of adsorbed analytes. This temperature increase can be linear, stepwise or may take other forms. A linear temperature gradient is shown in FIG. 19A. The fan remains off during the column heating from the initial temperature $T_1$ to the final temperature $T_2$. Once all analytes elute from the column, the fan is switched on at time $t_1$ to facilitate cyclical air flow and heat transfer in the chamber. The fan can remain on until the column returns to an initial temperature $T_1$ at time $t_2$. The fan is then switched off. Another chromatographic separation can be initiated, and the column is again heated from the initial temperature $T_1$ to a final temperature $T_2$. The fan is switched on again at time $t_3$ to facilitate cyclical air flow and heat transfer and remains on until the column returns to an initial temperature $T_1$ at time $t_4$. This process can be repeated to rapidly cool the column back to the initial temperature $T_1$ for further chromatographic separations. The initial and final temperatures can vary for example from about 25 degrees Celsius for the initial temperature and about 400 degrees Celsius for the final temperature or about 50 degrees Celsius for the initial temperature and about 300 degrees Celsius for the final temperature. Different initial and final temperatures may be used depending on the analytes to be separated and detected. The time which the fan remains on can vary from about 30 seconds up to about 10 minutes, more particularly about 1 minutes up to about 8 minutes or about 2 minutes to about 5 minutes. The exact fan run time can depend, at least in part, on the surrounding environment, the initial and final temperatures used and the overall size and materials used in the plates and chambers.

Figure 20:
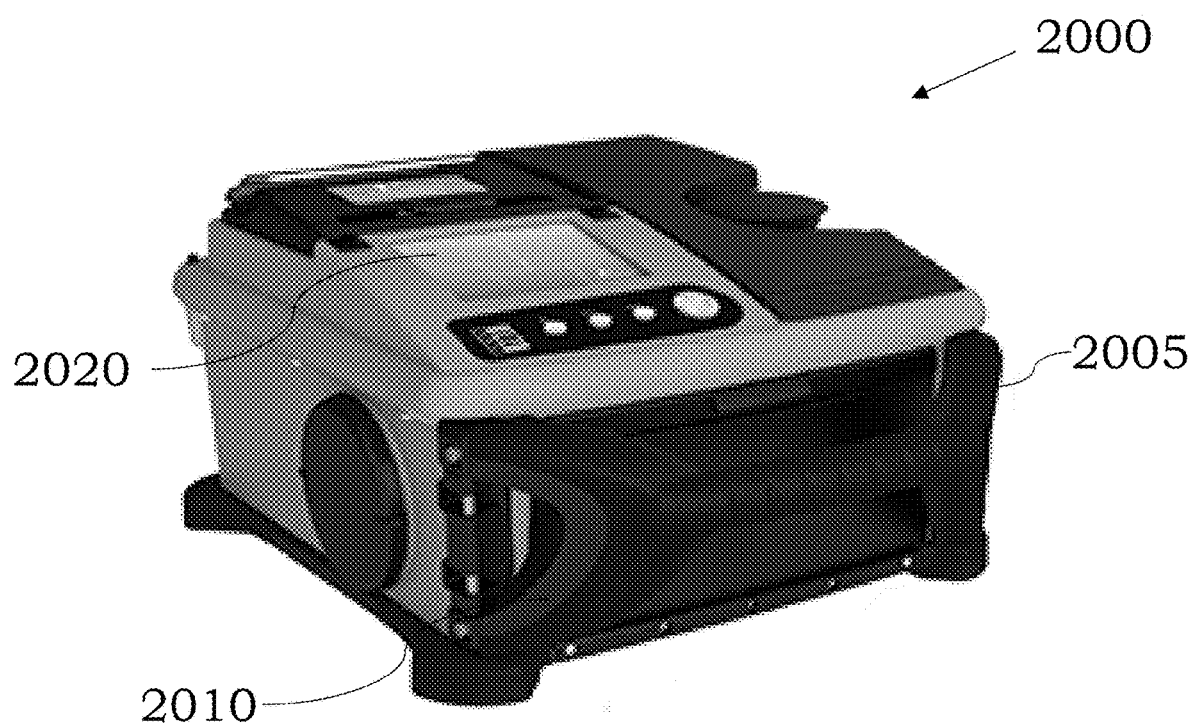
FIG. 20 is an illustration showing a portable gas chromatograph-mass spectrometer in accordance with some configurations.

In certain embodiments, the systems described herein may be configured as a portable chromatograph, e.g., a portable GC or a portable GC-MS. In some configurations, the portable instrument may take the form of a briefcase or backpack instrument that can be carried by a single user, e.g., by a single human, and placed at a desired site. In other instances, the portable chromatograph can be mounted (permanently or removably) to a vehicle, e.g., a tank, car, truck, airplane, military vehicle, etc. and may move from place to place with the vehicle for analyses in the field. An illustration is shown in FIG. 20, where a portable instrument 2000 comprises a housing 2005, a handle 2010 and an input screen 2020. The housing 2005 can form part of a thermally isolating chamber as described herein. For example, a top surface, side surface and bottom surface of the housing 2005 may form three sides of the isolating chamber and a plate can form the fourth side. The portable instrument 2000 may comprises its own on-board power source, a portable gas source and/or an internal gas generator, a space to receive a chromatography column, a detector, a processor and other electronics to permit analysis of samples remotely in the field. An overall weight of the portable instrument can be 50 kilograms or less, more particularly 30 kilograms or less or 25 kilogram or less, to facilitate transport and use by a single operator. The portable instrument may comprise its own on-board detector such as, for example, a mass spectrometer.

Figure 21:
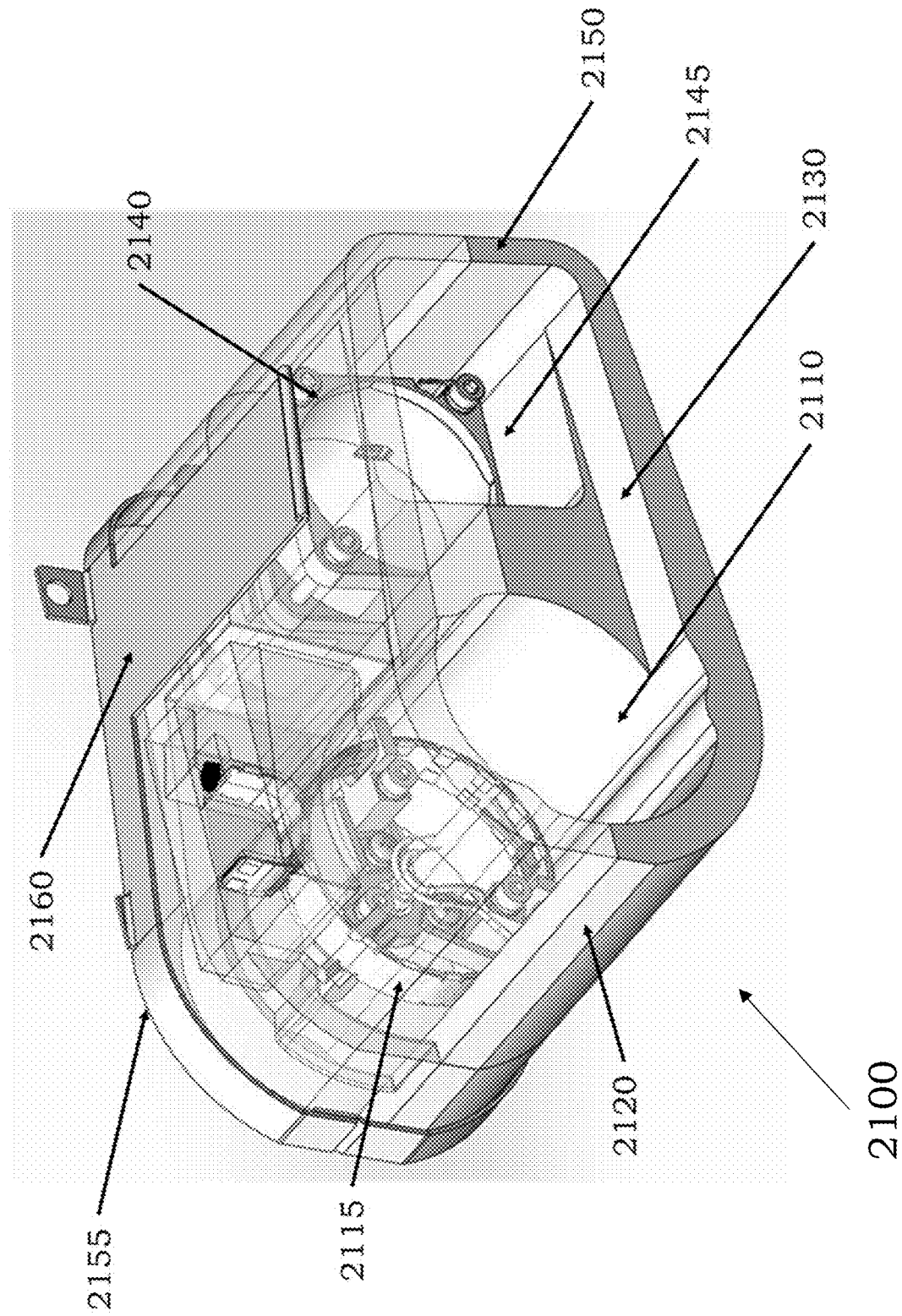
FIG. 21 is an illustration showing a three-dimensional chamber, in accordance with certain embodiments.

In certain embodiments, a three-dimensional chamber is shown in FIG. 21. The chamber 2100 comprises a column chamber 2110 that can receive a GC column 2115. An insulation shell 2120 is shown around the column chamber 2110. A circulation channel 2130 is present and can receive cooling air from a cooling fan 2140 in a cooling fan chamber 2145. A heat exchanger can be coupled to the chamber at a site 2150 and/or site 2155 or already present at the sites 2150, 2155. A mounting bracket 2160 is shown that can hold the chamber 2100 within another device or system. If desired, the chamber 2100 may be sealed such that dust, air, particles, etc. cannot enter into the chamber 2100 from the space surrounding the chamber 2100.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A thermal isolation chamber comprising:
   a first plate;
   a second plate; and
   an insulative barrier between the first plate and the second plate, wherein the thermal isolation chamber is configured to receive a chromatography column and thermally isolate the received chromatography column from other components in the thermal isolation chamber, the thermal isolation chamber comprising a first cyclical air flow path between the insulative barrier and the first plate and between the insulative barrier and the second plate, wherein the first cyclical air flow path is configured to receive an air flow and provide the received air flow to the received chromatography column to remove heat from the received chromatography column and transfer the removed heat to one or both of the first plate and the second plate.

2. The thermal isolation chamber of claim 1, further comprising a cooling device configured as a fan to provide the air flow through the first cyclical air flow path.

3. The thermal isolation chamber of claim 2, further comprising a cooling element in the thermal isolation chamber, wherein the fan is thermally coupled to the cooling element to provide cooled air to the first cyclical air flow path.

4. The thermal isolation chamber of claim 3, wherein the cooling element is downstream of the fan.

5. The thermal isolation chamber of claim 1, wherein at least one of the first plate and the second plate comprises a heat sink.

6. The thermal isolation chamber of claim 1, wherein at least one of the first plate and the second plate is configured to be cooled to decrease a temperature of air flow through the first cyclical air flow path.

7. The thermal isolation chamber of claim 1, wherein each of the first plate and the second plate is configured to be cooled to decrease a temperature of air flow through the first cyclical air flow path.

8. The thermal isolation chamber of claim 1, wherein at least one of the first plate and the second plate is thermally coupled to an external heat sink outside the chamber.

9. The thermal isolation chamber of claim 1, further comprising at least one heat pipe thermally coupled to one of the first plate and the second plate.

10. The thermal isolation chamber of claim 1, wherein the first plate is removable and the second plate is part of a housing of a chromatography system.

11. The thermal isolation chamber of claim 1, wherein the first plate comprises a metal material.

12. An analytical instrument comprising:
    a housing;
    a thermal isolation chamber in the housing, wherein the thermal isolation chamber comprises:
       at least a first plate; and
       an insulative barrier; and
    a chromatography column space within the thermal isolation chamber, wherein the chromatography column space is configured to receive a chromatography column, and wherein the thermal isolation chamber is configured to thermally isolate the received chromatography column from other components in the housing, the thermal isolation chamber comprising a first cyclical air flow path formed around the insulative barrier and from between the first plate and aft the insulative barrier in the thermal isolation chamber, wherein the first cyclical air flow path is configured to provide an air flow in the first cyclical air flow path around the insulative barrier to the received chromatography column to remove heat from the received chromatography column, and wherein the thermal isolation chamber is configured to transfer the removed heat to the first plate.

13. The analytical instrument of claim 12, further comprising an ionization source configured to fluidically couple to the chromatography column to receive separated analyte from the chromatography column and ionize the received, separate analyte.

14. The analytical instrument of claim 13, further comprising a mass analyzer configured to receive the ionized analyte.

15. The analytical instrument of claim 14, wherein the mass analyzer comprises an ion trap.

\* \* \* \* \*